United States Patent
Maitani et al.

(10) Patent No.: US 9,562,696 B2
(45) Date of Patent: Feb. 7, 2017

(54) HOT WATER SUPPLY SYSTEM CONTROL APPARATUS AND HOT WATER SUPPLY SYSTEM CONTROL PROGRAM AND HOT WATER SUPPLY SYSTEM OPERATING METHOD

(75) Inventors: Hiroshi Maitani, Tokyo (JP); Masashi Fujitsuka, Tokyo (JP); Motohiko Kawagishi, Tokyo (JP); Yoshihiro Takahashi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 934 days.

(21) Appl. No.: 13/641,165

(22) PCT Filed: Apr. 7, 2011

(86) PCT No.: PCT/JP2011/058755
§ 371 (c)(1),
(2), (4) Date: Oct. 15, 2012

(87) PCT Pub. No.: WO2011/129248
PCT Pub. Date: Oct. 20, 2011

(65) Prior Publication Data
US 2013/0025301 A1    Jan. 31, 2013

(30) Foreign Application Priority Data
Apr. 15, 2010 (JP) .................. 2010-093919

(51) Int. Cl.
 F24D 17/02   (2006.01)
 F24D 11/02   (2006.01)
 F24D 19/10   (2006.01)
(52) U.S. Cl.
CPC ....... *F24D 11/0214* (2013.01); *F24D 19/1039* (2013.01); *F24D 2220/042* (2013.01); *F24D 2220/044* (2013.01); *Y02B 30/126* (2013.01)

(58) Field of Classification Search
CPC .............. F02D 19/1054; F02D 19/1072; F02D 19/106; F02D 19/1066
See application file for complete search history.

(56) References Cited

U.S. PATENT DOCUMENTS 3,922,876 A * 12/1975 Wetherington, Jr. ... F25B 40/04
                                                       62/177
5,052,186 A * 10/1991 Dudley ................. F25B 49/022
                                                       62/215

(Continued)

FOREIGN PATENT DOCUMENTS

EP    1 162 419 A1   12/2001
EP    2 009 370 A1   12/2008

(Continued)

OTHER PUBLICATIONS

The Extended European Search Report issued Nov. 14, 2013, in Application No. / Patent No. 11768769.9-1602 / 2559953 PCT/JP2011058755.

(Continued)

*Primary Examiner* — M. Alexandra Elve
*Assistant Examiner* — Alexis Cox
(74) *Attorney, Agent, or Firm* — Oblon, McClelland, Maier & Neustadt, L.L.P.

(57) ABSTRACT

A control apparatus for a heat pump hot water supply system of the indirect heating method is provided such that a change in heat transfer efficiency of a second heat exchanger is estimated by using either or both of a tank water temperature and a temperature of a second refrigerant flowing through a water circuit. When the heat transfer efficiency is determined to be high, an operation switching unit raises an output of a heat source device. When the heat transfer efficiency is determined to be low, the operation switching unit lowers the output of the heat source device.

4 Claims, 16 Drawing Sheets

(56) References Cited

U.S. PATENT DOCUMENTS

| | | | | |
|---|---|---|---|---|
| 5,081,846 | A * | 1/1992 | Dudley | F24D 19/1072 62/115 |
| 5,241,829 | A * | 9/1993 | Irie | F25B 30/02 62/204 |
| 5,249,432 | A * | 10/1993 | Ichikawa | F25B 13/00 62/197 |
| 5,272,885 | A * | 12/1993 | Watanabe | F24F 3/06 62/184 |
| 6,430,949 | B2 * | 8/2002 | Noro | 62/183 |
| 6,467,289 | B2 * | 10/2002 | Kuroki | F24D 19/1054 62/201 |
| 7,788,941 | B2 * | 9/2010 | Campbell | F24F 5/0017 62/185 |
| 8,037,931 | B2 * | 10/2011 | Penev | F24D 17/0021 126/585 |
| 8,082,744 | B2 * | 12/2011 | Hwang | F24D 11/0214 62/150 |
| 8,365,546 | B2 * | 2/2013 | Hayashida | H01M 10/486 236/1 C |
| 9,027,359 | B2 * | 5/2015 | O'Brien | F24D 3/082 62/175 |
| 9,097,444 | B2 * | 8/2015 | Lee | F25B 7/00 |
| 2002/0113133 | A1 * | 8/2002 | Saitoh | F24D 19/1054 237/8 R |
| 2004/0144528 | A1 | 7/2004 | Kunimoto et al. | |
| 2009/0250203 | A1 * | 10/2009 | Ida | F24D 3/18 165/287 |
| 2010/0117843 | A1 * | 5/2010 | Kobayashi | F24D 17/02 340/622 |
| 2010/0282435 | A1 * | 11/2010 | Yabuuchi | F24D 17/0073 165/63 |
| 2011/0016897 | A1 * | 1/2011 | Akagi | F24D 3/18 62/161 |
| 2011/0120179 | A1 * | 5/2011 | Chin | F24D 3/08 62/510 |
| 2011/0289950 | A1 * | 12/2011 | Kim | F24D 11/0214 62/160 |
| 2011/0289952 | A1 * | 12/2011 | Kim | F24D 11/0214 62/189 |
| 2011/0314848 | A1 | 12/2011 | Tanaka et al. | |
| 2012/0180984 | A1 * | 7/2012 | Fujitsuka | F24D 11/0214 165/61 |
| 2012/0222440 | A1 * | 9/2012 | Matsui | F25B 7/00 62/159 |
| 2013/0145786 | A1 * | 6/2013 | Tamaki | F25B 13/00 62/161 |
| 2013/0312443 | A1 * | 11/2013 | Tamaki | F25B 49/022 62/228.1 |
| 2015/0159960 | A1 * | 6/2015 | Fujitsuka | F25B 30/02 165/10 |
| 2016/0084546 | A1 * | 3/2016 | Yokoyama | F25B 1/02 62/324.6 |

FOREIGN PATENT DOCUMENTS

| | | |
|---|---|---|
| JP | 61 107065 | 5/1986 |
| JP | 2002 243276 | 8/2002 |
| JP | 2004 132647 | 4/2004 |
| JP | 2004 347148 | 12/2004 |
| JP | 2005 61662 | 3/2005 |
| JP | 2006 234314 | 9/2006 |
| JP | 2006 343058 | 12/2006 |
| JP | 2007-198699 | 8/2007 |
| JP | 2007 278656 | 10/2007 |
| JP | 2009 162458 | 7/2009 |
| JP | 2009 210201 | 9/2009 |
| JP | 2010 25494 | 2/2010 |
| JP | 2010 121801 | 6/2010 |
| JP | 2010 236817 | 10/2010 |
| JP | 2010 249333 | 11/2010 |

OTHER PUBLICATIONS

International Search Report Issued Jun. 7, 2011 in PCT/JP11/58755 Filed Apr. 7, 2011.

Combined Chinese Office Action and Search Report issued Aug. 1, 2014 in Patent Application No. 201180018971.3 (with Partial English Translation and English Translation of Category of Cited Documents).

* cited by examiner

Fig. 3

| OPERATING MODE | WATER HEATING START (FIRST OPERATING MODE) | SECOND OPERATING MODE | WATER HEATING COMPLETION |
|---|---|---|---|
| | 1 | 2 | 3 |
| OPERATION SWITCHING DETERMINATION VALUE | 20°C | 40°C | 60°C |

HOT WATER SUPPLY SYSTEM CONTROL APPARATUS AND HOT WATER SUPPLY SYSTEM CONTROL PROGRAM AND HOT WATER SUPPLY SYSTEM OPERATING METHOD

TECHNICAL FIELD

This invention relates to an operating method of a heat pump hot water supply system that heats water by using a heat exchanger to heat-exchange a heat quantity obtained from ambient air by a refrigerant cycle of a heat pump, and supplies heated hot water to a hot water supply facility.

BACKGROUND ART

FIG. 17 shows a conventional heat pump hot water supply system of an indirect heating method. In the conventional heat pump hot water supply system, a heat source device 20 having a heat pump refrigeration cycle for circulating a refrigerant as shown in FIG. 17 (indirect heating method) is connected with a water circuit 21 through a water heat exchanger 202 (acting as a condenser). FIG. 17 shows an example where the water heat exchanger 202 is contained in a housing of the heat source device 20. However, the water heat exchanger 202 may be connected with the heat source device 20 outside the housing of the heat source device 20. The water circuit 21 is configured such that hot water or an antifreeze solution heated by the refrigerant passing through the water heat exchanger 202 circulates in the water circuit 21. A circulation pump 24, a hot water storage tank 25, a radiator or fan coil unit 26, a floor heating appliance 27 and so on are connected to the water circuit 21 with pipes.

As methods of supplying heat to the hot water storage tank 25, a direct heating method and the indirect heating method shown in FIG. 17 are available.

(1) In the direct heating method, hot water to be used for hot water supply is directly heated by the water heat exchanger 202.
(2) In the indirect heating method, heat is supplied by heat exchange between the hot water or antifreeze solution heated by the water heat exchanger 202 and hot water to be used for hot water supply, the heat exchange being effected through a second heat exchanger 29 provided in or outside the hot water storage tank 25.

(Indirect Heating Method)

Referring to FIG. 17, the indirect heating method will be described. In the indirect heating method, as shown in FIG. 17, the hot water or antifreeze solution heated in the water heat exchanger 202 can be directly supplied to a radiation heating appliance such as the radiator or fan coil unit 26 or the floor heating appliance 27 and can be used for heating a room. In the indirect heating method, as shown in FIG. 17, heat supply channels are switched by a three-way valve 23. During a water heating operation in the hot water storage tank 25, the three-way valve 23 is set such that the water circuit 21 is switched to a channel in which the second heat exchanger 29 is placed. Channel switching may be effected by using a plurality of two-way valves. As a result of channel switching, the hot water heated in the water heat exchanger 202 flows into the second heat exchanger 29. The water temperature in the hot water storage tank 25 rises by a heat quantity heat-exchanged with this hot water that has flowed in. When a value measured by a tank water temperature sensor 35 provided in the hot water storage tank 25 or on a wall of the hot water storage tank 25 reaches a water heating temperature setting value, the water heating operation is finished. When a user starts using hot water supply, the hot water is discharged from an upper portion of the hot water storage tank 25. The discharged hot water is mixed with water. The mixed hot water is supplied to the user as the hot water at a specified temperature set by the user through a remote controller or the like. On the other hand, the water is supplied from a lower portion of the hot water storage tank 25. Thus, the inside of the hot water storage tank 25 is always fully filled with water.

(Direct Heating Method)

In a water heating operation by a conventional heat pump hot water supply system of a direct heating method (for example, Patent Document 1), operation at the beginning is performed at a compressor frequency computed in accordance with the temperature of hot water supplied from a hot water storage tank to a heat source device. Then, when operation of the heat source device has stabilized, a deviation of a hot water outlet temperature of the heat source device from a hot water outlet temperature setting value is computed and the amount of change in this deviation is computed. Then, based on the obtained deviation and amount of change in the deviation, a correction amount of the compressor frequency is obtained. The current operating frequency is corrected with the obtained correction amount, and operation is performed at the corrected compressor frequency. In the conventional heat pump hot water supply system of the direct heating method, the compressor frequency is controlled as described above. In the direct heating method, low-temperature water at a lower portion of the tank is always supplied to the heat source device, so that operation can be performed with stable heat exchange efficiency in the water heat exchanger 202.

CITATION LIST

Patent Document

Patent Document: JP 2002-243276 A

DISCLOSURE OF INVENTION

Technical Problem

On the other hand, in the indirect heating method, a rate of rise of the water temperature in the hot water storage tank 25 is slower than a rate of rise of the water temperature of circulating hot water circulating in the water circuit 21. The rate of rise of the water temperature in the hot water storage tank 25 depends on the heat transfer efficiency of the second heat exchanger 29. However, the heat transfer efficiency changes depending on the state of natural convection in the hot water storage tank 25, and the heat transfer efficiency is low in a stage where natural convection is not sufficiently formed such as upon start of a water heating operation. Thus, a heat quantity supplied from the heat source device 20 to the circulating hot water circulating in the water circuit 21 exceeds a heat quantity heat-exchanged by the second heat exchanger 29 and the water in the hot water storage tank 25. As a result, a return temperature of the circulating hot water returned to the heat source device 20 gradually rises.

When the return temperature of the circulating hot water returned to the heat source device 20 rises, a temperature difference decreases between the circulating hot water flowing into the water heat exchanger 202 and the refrigerant in the water heat exchanger 202, thereby reducing the heat exchange efficiency and reducing a COP (coefficient of performance) which is represented as a supply heat quantity divided by consumed power. In the method of Patent Document 1, the compressor frequency is raised as appropriate when a deviation of the hot water outlet temperature is large, so that the hot water outlet temperature of the heat source device rises in a short time. When the hot water outlet temperature of the heat source device rises, the return temperature also rises accordingly rapidly, thereby reducing the COP. In the course of time, there is almost no difference between the temperatures of the refrigerant and the hot water, so that the hot water outlet temperature cannot be raised further, and operation has to be performed by lowering the compressor frequency to reduce the supply heat quantity. As a result, an operating state with low heat exchange efficiency continues for a prolonged period of time, and an average COP during a water heating period is reduced. This has been a problem.

On the other hand, when operation is performed by keeping the compressor frequency low so as to prevent the hot water outlet temperature from becoming too high, the circulating hot water temperature can be prevented from rising too rapidly compared to the tank water temperature, thereby improving the heat exchange efficiency. Further, the consumed power of the compressor is reduced in proportion to the frequency cubed to the third power, so that the COP can be improved. However, the supply heat quantity is reduced, leading to a prolonged water heating time and an increased risk of running out of hot water. This has been a problem.

It is an object of this invention to provide an operating method of a heat pump hot water supply system by which an average COP during a water heating period can be improved and a risk of running out of hot water can be prevented from increasing in a heat pump hot water supply system of an indirect heating method.

Solution to Problem

A hot water supply system control apparatus according to this invention is a hot water supply system control apparatus for a hot water supply system, the hot water supply system including a heat pump apparatus having a first refrigerant circuit in which a compressor, a first radiator, an expansion mechanism, and an evaporator are sequentially connected by pipes and through which circulates a first refrigerant heated by the compressor;

a second refrigerant circuit in which the first radiator is connected with a second radiator that heat-exchanges with hot water storage tank water stored in a hot water storage tank, and in which circulation of a second refrigerant heated by the first refrigerant passing through the first radiator causes the hot water storage tank water to be heated by the second radiator; and a tank water temperature detection sensor that detects a tank water temperature of the hot water storage tank water, the hot water supply system control apparatus comprising:

an operation control unit that, when the tank water temperature of the hot water storage tank water detected by the tank water temperature detection sensor is equal to or lower than a first temperature, operates the hot water supply system with a first operating method until the tank water temperature rises to a second temperature which is higher than the first temperature, the first operating method being an operating method focusing on a coefficient of performance, and when the tank water temperature exceeds the second temperature, operates the hot water supply system with a second operating method until the tank water temperature rises to a third temperature which is higher than the second temperature, the second operating method being an operating method focusing on elevation of the tank water temperature.

Advantageous Effects of Invention

This invention can provide a heat pump hot water supply system in which an average COP during a water heating period can be improved and a risk of running out of hot water can be prevented from increasing in a heat pump hot water supply system of an indirect heating method.

BRIEF DESCRIPTION OF DRAWINGS

FIG. 3 is a diagram showing operation switching determination values (operation switching temperatures) corresponding to operating modes of the heat pump hot water supply system 1000 in the first embodiment;

DESCRIPTION OF PREFERRED EMBODIMENTS

First Embodiment

Figure 1:
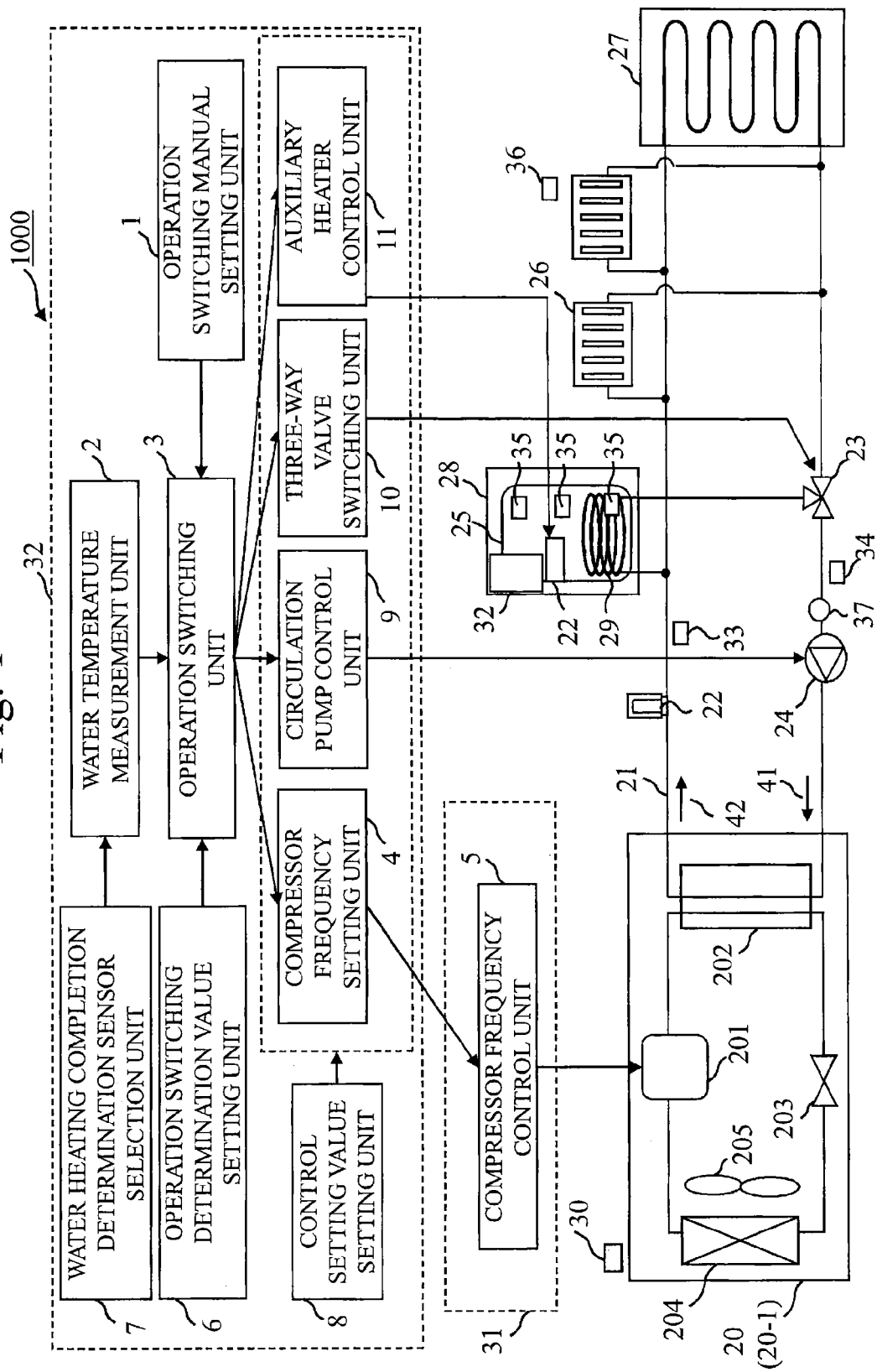
FIG. 1 is a configuration diagram of a heat-pump hot water supply system 1000 in a first embodiment.
Figure 17:
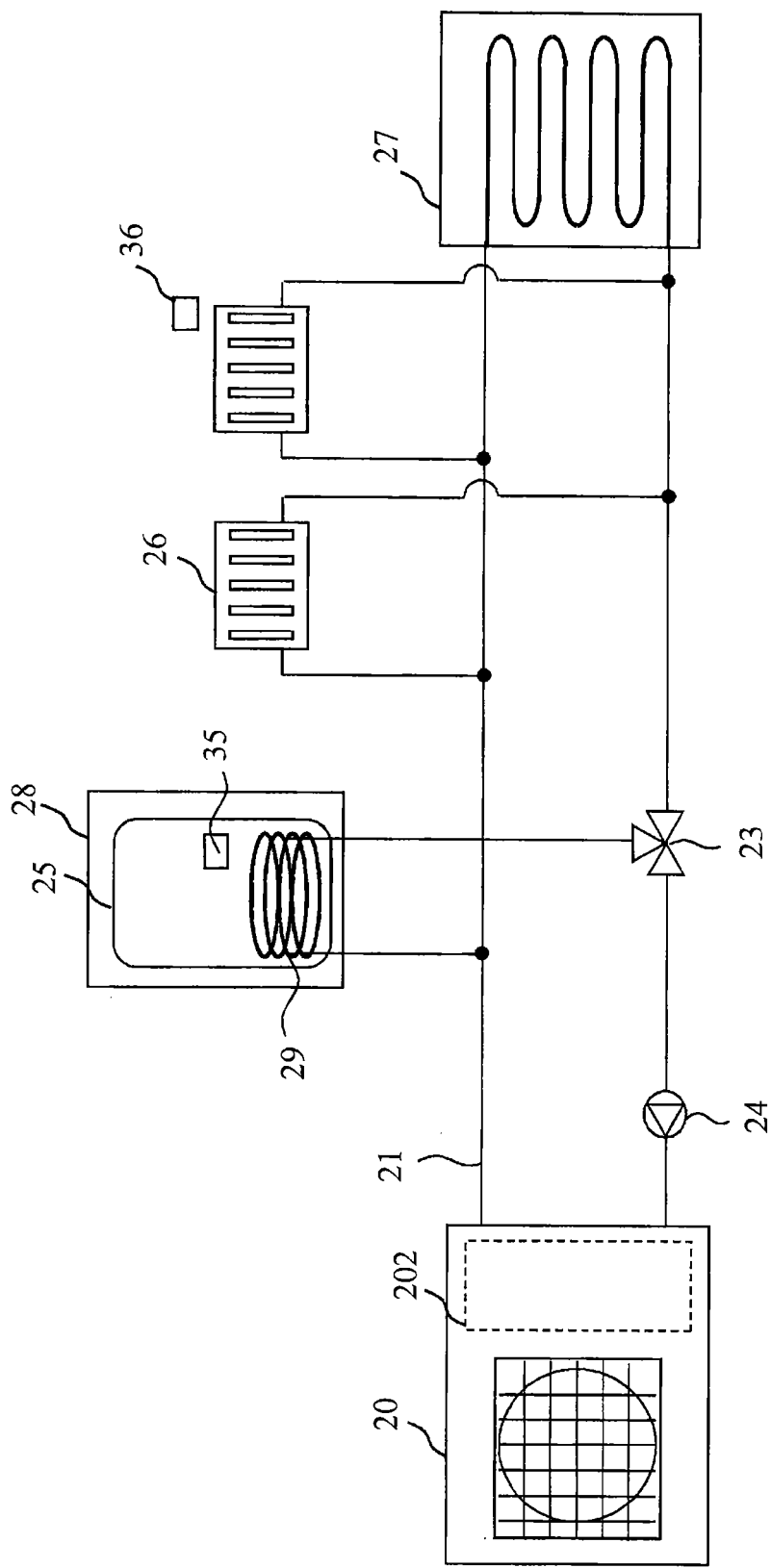
FIG. 17 is a diagram showing a conventional heat pump hot water supply system of an indirect heating method.

Referring to FIG. 1, a heat pump hot water supply system 1000 of a first embodiment will be described. In contrast to a conventional heat pump hot water supply system shown in FIG. 17, the heat pump hot water supply system 1000 of FIG. 1 includes a heat source device controller 31 and a system controller 32 (hot water supply system control apparatus). As to components, in contrast to the conventional heat pump hot water supply system shown in FIG. 17, the heat pump hot water supply system 1000 of FIG. 1 includes an auxiliary heat source 22 and sensors such as one or a plurality of tank water temperature sensors 35 (tank water temperature detection sensors), an ambient air temperature sensor 30, a heated hot water temperature sensor 33 (an example of a second refrigerant temperature detection sensor), a return hot water temperature sensor 34 (an example of the second refrigerant temperature detection sensor), a room temperature sensor 36, and a flow sensor 37. When a circulation pump has a fixed rotational speed, the flow sensor 37 may be omitted.

The heat pump hot water supply system 1000 is characterized in that the system controller 32 heats tank water by switching between a "first operating mode" (may also be referred to as a first operating method) and a "second operating mode" (may also be referred to as a second operating method) to be described later, the first operating mode focusing on a COP and the second operating mode focusing on elevation of the tank water temperature. With these operating modes, an average COP during a water heating period can be improved, and a risk of running out of hot water can be prevented from increasing.

FIG. 1 is a block diagram of the heat pump hot water supply system 1000. Referring to FIG. 1, the heat pump hot water supply system 1000 of an indirect heating method will be described.

(Heat Source Device 20)

A heat source device 20 (may also be referred to as a heat pump apparatus) will be described. The heat source device 20 constitutes a refrigeration cycle circuit. In the refrigeration cycle circuit, a compressor 201, a water heat exchanger 202 (first radiator), an expander 203, and an air heat exchanger 204 are sequentially connected by pipes. The heat source device 20 may be configured such that the compressor 201, the water heat exchanger 202, the expander 203, the air heat exchanger 204, and a fan 205 are all contained in a housing 20-1 or such that the water heat exchanger 202 is provided outside the housing 20-1. A refrigerant heated in the compressor 201 circulates in the refrigeration cycle circuit. The refrigeration cycle circuit of the heat source device 20 may be referred to as a first refrigerant circuit, and the refrigerant circulating in the refrigeration cycle circuit may be referred to as a first refrigerant. A water circuit 21 may be referred to as a second refrigerant circuit, and the refrigerant circulating in the water circuit 21 may be referred to as a second refrigerant. In the following embodiments, the second refrigerant is water. However, this is an example, and other types of refrigerant may be used. In the water circuit 21, the water heat exchanger 202 is connected with a second heat exchanger 29 that heat-exchanges with hot water storage tank water stored in a hot water storage tank 25. The hot water storage tank water is heated by the second heat exchanger 29 by circulation of the second refrigerant heated by the first refrigerant passing through the water heat exchanger 202.

(1) The compressor 201 can have its operating frequency changed by an inverter.
(2) The water heat exchanger 202 heat-exchanges between the refrigerant (first refrigerant) and the water (second refrigerant) to condense the refrigerant (first refrigerant) (may also be referred to as a condenser 202).
(3) The expander 203 is an expansion mechanism that can adjust a flow of the refrigerant by a solenoid valve or the like.
(4) The air heat exchanger 204 is placed outside the room or the like. The air heat exchanger 204 has the fan 205 with a variable capability that facilitates heat exchange between air and the refrigerant, and evaporates the refrigerant (may also be referred to as an evaporator 204).

(System Controller 32, Heat Source Device Controller 31)

(1) The heat source device controller 31 is contained in the housing (20-1). The heat source device controller 31 controls operation of the compressor 201, the condenser 202, the expander 203, and the evaporator 204.
(2) The system controller 32 is contained in a hot water storage tank unit 28 containing the hot water storage tank 25. The system controller 32 outputs commands for starting and stopping the heat source device controller 31, commands for the operating frequency of the compressor, commands for starting and stopping a circulation pump 24 and for the rotational speed of the circulation pump 24, commands for switching a position of a three-way valve 23, commands for starting and stopping an auxiliary heater (the auxiliary heat source 22 placed in the water circuit 21) and an immersion heater (the auxiliary heat source 22 in the hot water storage tank 25).

When the heat source device 20 captures heat from the air by the refrigeration cycle, hot water (the second refrigerant) is heated through the water heat exchanger 202 which is a condenser, and the hot water circulates in the water circuit 21. When the heat source device 20 is faulty, or when there is a shortage of heat supply capability due to a decrease in ambient air temperature, the hot water is further heated by using, for example, an electric heater as the auxiliary heat source 22.

The hot water circulating in the water circuit 21 is supplied to the hot water storage tank 25 and "a radiator or a fan coil unit 26, or a floor heating appliance 27" which are heating appliances, depending on the operating states of the three-way valve 23 and the circulation pump 24.

(Various Types of Sensors)

The heat pump hot water supply system 1000 shown in FIG. 1 includes the ambient air temperature sensor 30, the heated hot water temperature sensor 33, the return hot water temperature sensor 34, the tank water temperature sensor 35, the room temperature sensor 36, and the flow sensor 37.

(1) The ambient air temperature sensor 30 detects the ambient air temperature around the heat source device 20.
(2) The heated hot water temperature sensor 33 measures the temperature of the circulating hot water supplied to the hot water storage tank 25 or the heating appliance.
(3) The return hot water temperature sensor 34 measures the temperature of the circulating hot water returned to the heat source device after radiating heat in the hot water storage tank and the heating appliance.
(4) The tank water temperature sensor 35 measures the water temperature at least at one location in a vertical direction within the tank.
(5) The room temperature sensor 36 measures the room temperature at least at one location in a room where the heating appliance is installed.
(6) The flow sensor 37 measures the flow of the hot water in the water circuit 21.
(7) Sensor measurement values are sent from each sensor to the system controller 32 at regular intervals.

(User Operations)

The heat pump hot water supply system 1000 of the first embodiment is configured such that a user can set "operation commands" for manually specifying start and stop of a water heating operation in the hot water storage tank or a room heating operation, an "operating schedule" for specifying times for enabling and disabling automatic operation and automatic stop of the water heating operation in the hot water storage tank or the room heating operation, and "temperatures" required for determining conditions for the water heating operation in the hot water storage tank or the room heating operation, the user setting these by way of an operation interface of the system controller 32 provided in the tank unit 28 or a remote controller installed in the room to be heated. The operation commands, operating schedule, and setting temperatures set by the user are sent to the system controller 32 by wireless or wired communication.

Based on measurement values from sensors such as the ambient air temperature sensor 30 and the heated hot water temperature sensor 33 to the flow sensor 37 and values set by the user through the remote controller, the system controller 32 transfers or sends to the heat source device controller 31 operation command values that can be interpreted by the heat source device controller 31. The operation command values may be, for example, start/stop, a compressor operating frequency, and a hot water outlet temperature of the heat source device. In addition to operation commands to the heat source device 20, the system controller 32 can send to an actuator of each device operation commands for the rotational speed or start/stop of the circulation pump 24, start/stop of the auxiliary heat source 22, and switching of the three-way valve 23.

In FIG. 1, the system controller 32 and the heat source device controller 31 are shown as separate components. However, they may be implemented as a single system controller (computer) including the functions of the both and placed in the housing of the heat source device or in the tank unit.

The heat pump hot water supply system 1000 is operated by the system controller 32 and the heat source device controller 31.

Functions of components of the system controller 32 and the heat source device controller 31 will be described.

(1) An operation switching manual setting unit 1 is provided such that the user manually sets a hot water supply operation command, a room heating operation command, a stop command and so on (switching of operation).

(2) A water temperature measurement unit 2 collects values detected by the heated hot water temperature sensor 33, the return hot water temperature sensor 34, and the tank water temperature sensor 35 by converting them into data that can be computed.

(3) An operation switching unit 3 switches the operating mode in accordance with a detected value of the tank water temperature. In the system controller 32 of the first embodiment, the operation switching unit 3 constitutes an operation control unit.

(4) A compressor frequency setting unit 4 sets the compressor frequency in accordance with a control setting value set by a control setting value setting unit 8 and arithmetic logic of the operating mode selected by the operation switching unit 3.

(5) A compressor frequency control unit 5 controls the operating frequency of the compressor based on a frequency set by the compressor frequency setting unit 4.

(6) An operation switching determination value setting unit 6 sets tank water temperatures as operation switching determination values corresponding to a plurality of operating modes.

(7) A water heating completion determination sensor selection unit 7 selects a sensor based on which completion of water heating is to be determined.

(8) The control setting value setting unit 8 sets control setting values for determining the compressor frequency, the flow of the circulation pump, operation of the three-way valve, and operation of the auxiliary heater.

(9) A circulation pump control unit 9 controls start/stop and the flow of the pump in accordance with the operating mode selected by the operation switching unit 3.

(10) A three-way valve switching unit 10 switches between hot water storage tank heating or room heating.

(11) An auxiliary heater control unit 11 switches between activating and stopping the auxiliary heater.

(Water Temperature Measurement Unit 2)

In the tank water temperature sensor 35 included in the water temperature measurement unit 2, a single sensor or a plurality of sensors are placed in a vertical direction within the tank or on an outside wall of the tank as an alternative to measuring the tank water temperature, as shown in FIG. 1. A voltage or current value detected by each temperature sensor is converted into a water temperature value. The tank water temperature is collected from each temperature sensor continuously at fixed intervals.

(Water Heating Completion Determination Sensor Selection Unit 7)

The water heating completion determination sensor selection unit 7 is provided when there are a plurality of the tank water temperature sensors 35, and selects which of the plurality of the temperature sensors (water temperature sensors 35) placed in the vertical direction is to be used for determining completion of water heating. For example, assume that the hot water storage tank 25 is of 200 liters and the top of the tank is designated as 0 liters. When the temperature sensors are placed at five positions from the top to the bottom at 0 liters, 50 liters, 100 liters, 150 liters, and 200 liters, a particular temperature sensor is selected for determination, such as a temperature sensor at an intermediate position of 100 liters is selected for determining completion of water heating. Alternatively, selection can be made such that all the temperature sensors at the five positions should reach respective setting temperatures.

(Operation Switching Determination Value Setting Unit 6)

The operation switching determination value setting unit 6 sets the tank water temperature for determining switching of operation. As a setting value, the tank water temperature may be directly set. Alternatively, a setting value may be computed by using values detected by the sensors 33 to 37 or values set in the operation switching determination value setting unit 6. For example, an average of the tank water temperature detection value at start of water heating and the setting value of the water heating completion temperature may be used as an operation switching determination value.

The number of types of the tank water temperature to be set corresponds to the number of types of operation among which the operation switching unit 3 determines switching of operation. The types of the tank water temperature to be set are water temperatures at which to start water heating, to complete water heating, and to switch the operating mode during water heating. A plurality of temperatures may be set as the temperature at which to switch the operating mode during water heating. It is also possible to register a plurality of combinations of temperatures at which to start water heating, to complete water heating, and to switch the operating mode during water heating, and set them as an operating schedule from which a desired combination can be selected depending on the day of the week or the season.

(Operation Switching Unit 3)

The operation switching unit 3 compares the tank water temperature set in the operation switching determination value setting unit 6 with the tank water temperature measured by the water temperature measurement unit 2, and switches the operation of the heat source device 20 in accordance with criteria for determination (temperatures for determination) shown in FIG. 3 to be described later. The operation switching unit 3 operates in the first operating mode upon start of a water heating operation in the hot water storage tank. When the tank water temperature reaches the operation switching determination value which is lower than the water heating completion temperature, the operation switching unit 3 switches the operation to the second operating mode.

(Compressor Frequency Setting Unit 4)

The compressor frequency setting unit 4 sets the compressor frequency based on frequency computation logic of the operating mode determined by the operation switching unit 3. The compressor frequency may be represented as an absolute value of the frequency or as a ratio to the rated or upper limit frequency. In the first operating mode, the compressor frequency setting unit 4 sets the compressor frequency to the frequency set in the control setting value setting unit 8. Here, based on the characteristics of the heat source device shown in FIGS. 4 to 6, a frequency with higher COP than in the second operating mode is set within a return temperature range in the first operating mode.

In the second operating mode, the compressor frequency is set to the frequency set in the control setting value setting unit 8. Alternatively, the compressor frequency setting value is raised or lowered based on a deviation of the current value from the target value of the tank water temperature or the amount of change in the deviation, so as to reduce the deviation.

The setting value or the amount to be increased or decreased from the setting value of the compressor frequency set in the first operating mode or the second operating mode may be adjusted depending on values detected by the sensors for the ambient air temperature, the return temperature to the heat source device, the tank water temperature and so on.

(Compressor Frequency Control Unit 5)

The compressor frequency control unit 5 outputs a pulse command to the inverter of the compressor 201 so as to operate at the frequency set by the compressor frequency setting unit 4. The compressor frequency control unit 5 is one of the functions of the heat source device controller 31. The heat source device controller 31 controls the solenoid valve of the expander 203 and the fan rotational speed of the fan 205 in conjunction with changes in the compressor frequency, and supplies heat while maintaining the stability of the refrigeration cycle. On the other hand, when the refrigerant temperature rises in accordance with the setting value of the compressor frequency setting unit 4 and reaches the upper limit, the heat source device controller 31 lowers the compressor frequency so as to maintain the stability of the refrigeration cycle.

(Description of Actions)

Figure 2:
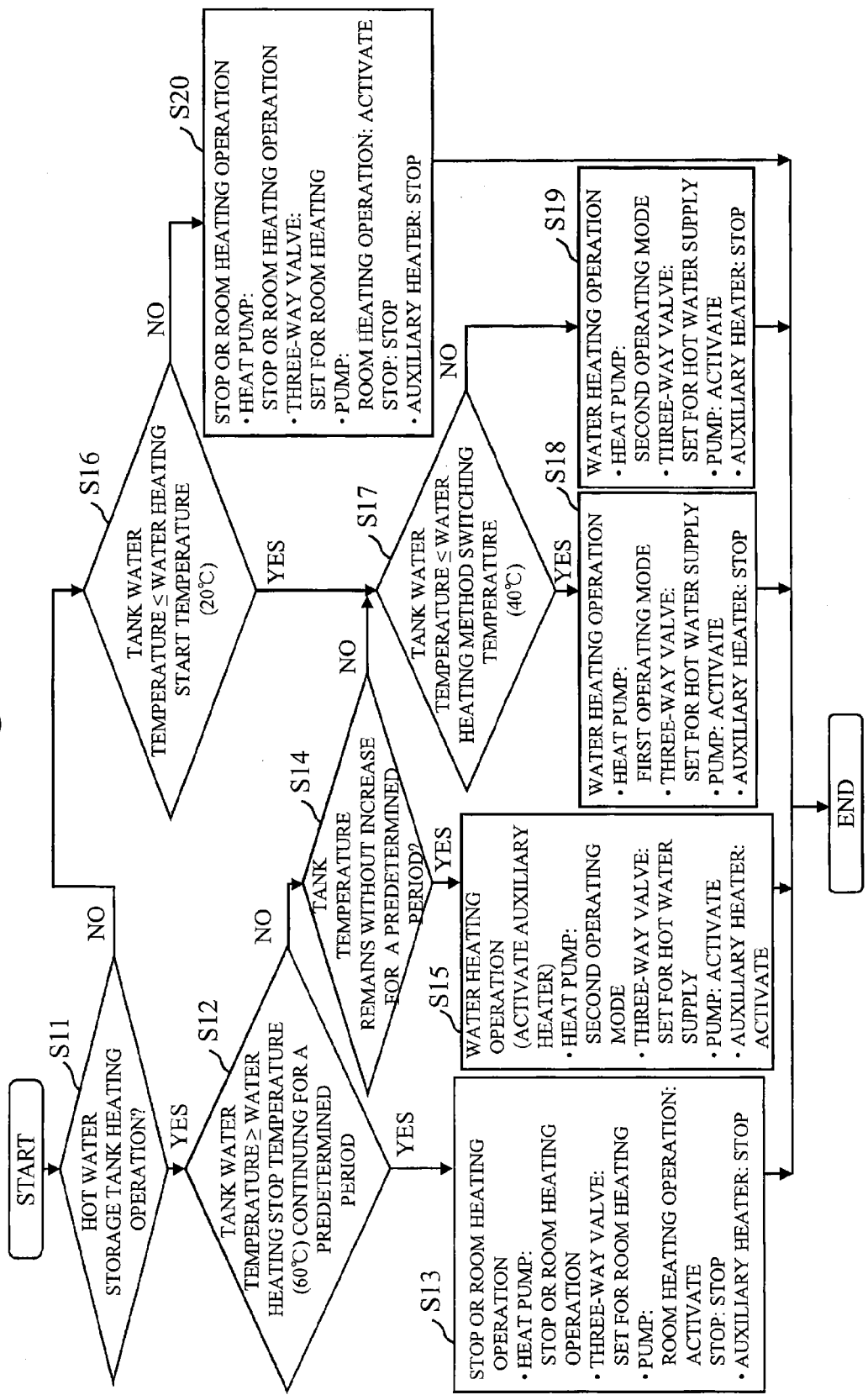
FIG. 2 is a flowchart showing a determination process of an operation switching unit 3 in the first embodiment.

Referring to FIGS. 2 and 3, operation switching actions of the operation switching unit 3 will now be described. The following actions are performed by the operation switching unit 3.

FIG. 2 is a flowchart of actions of the operation switching unit 3.

FIG. 3 is a table showing an example of operation switching determination values (operation switching temperatures). In FIG. 3, "20° C." (an example of a first temperature) is a criterion of determination at S16, "40° C." (an example of a second temperature) is a criterion of determination at S17, and "60° C." (an example of a third temperature) is a criterion of determination at S12.

If "the heat source device is stopped or operating in the room heating mode", that is, if "the heat source device is not operating in the hot water storage tank heating mode" (NO at S11) and if the measured water temperature value of the hot water storage tank 25 (also to be referred to as the tank water temperature) is higher than the water heating start temperature (for example, 20° C. as shown in FIG. 3) (NO at S16), the operation switching unit 3 maintains the operating state (S20). On the other hand, if the tank water temperature is lower than the water heating start temperature at S16, the operation switching unit 3 determines that water heating should be started (YES at S16) and processing proceeds to S17 to start water heating in the hot water storage tank 25. On the other hand, if the hot water supply tank heating operation is manually set in the operation switching manual setting unit 1, processing proceeds to S17 irrespective of determination at S16.

At S17, the operation switching unit 3 compares the tank water temperature with the "water heating method switching temperature" which is a setting value. The "water heating method switching temperature" is set to 40° C., for example, as shown in FIG. 3.

If the tank water temperature≤40 degrees, the operation switching unit 3 operates the heat pump apparatus in the first operating mode (S18).

If the tank water temperature>40 degrees, the operation switching unit 3 operates the heat pump apparatus in the second operating mode (S19).

<S18: First Operating Mode>

Figure 5:
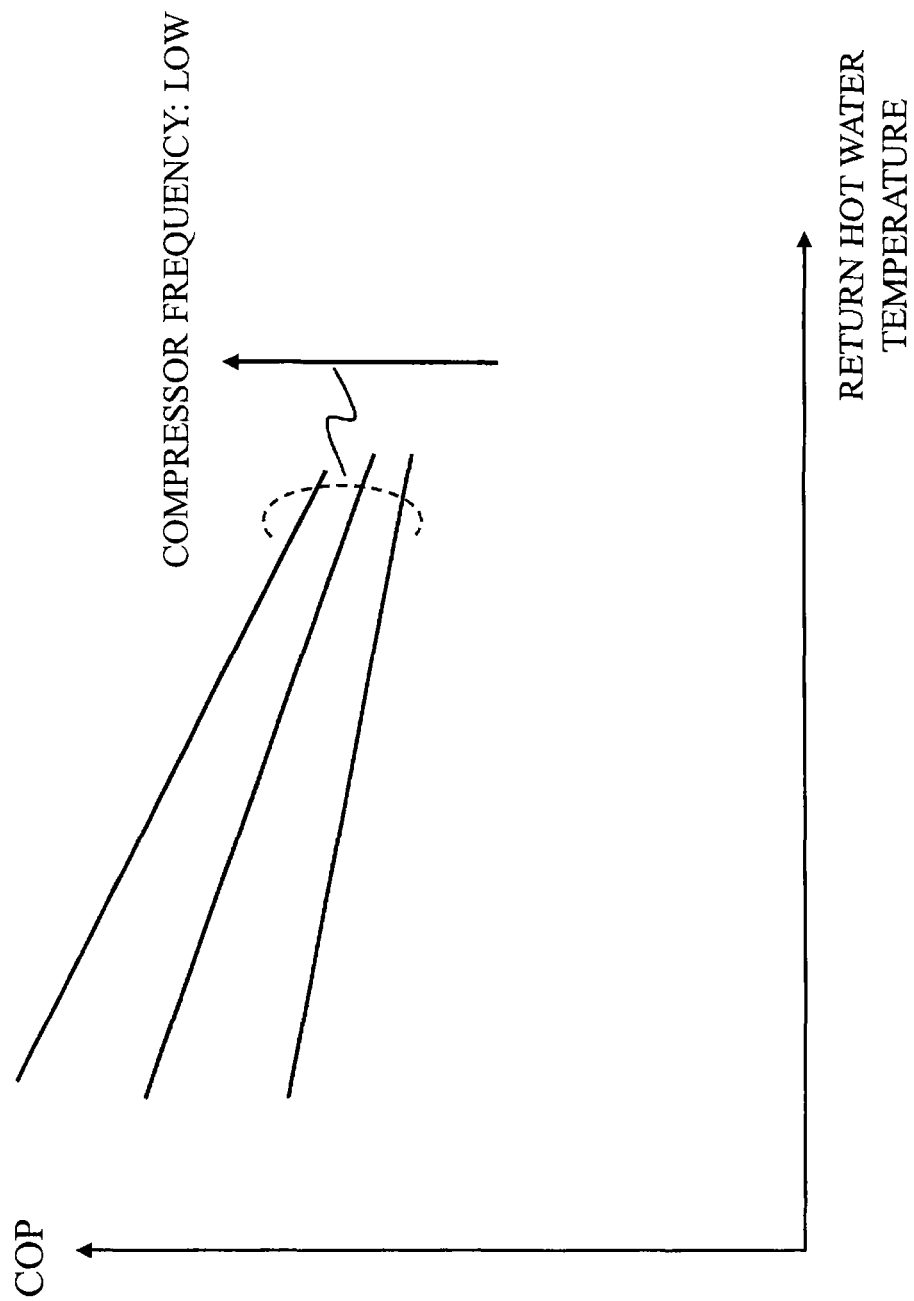
FIG. 5 is a diagram showing a relation between the return hot water temperature and a COP corresponding to each compressor frequency of the heat source device in the first embodiment.

If S18 is taken, the operation switching unit 3 of the system controller 32 sets the three-way valve 23 for hot water supply, activates the circulation pump 24 with the rated flow, or the flow or the flow ratio to the rated flow or the rotational speed set in the control setting value setting unit 8. After the flow is stabilized, the operation switching unit 3 activates the heat source device 20 and operates the heat source device 20 in the "first operating mode". The "first operating mode" is an operating mode in which the compressor 201 is operated at the frequency set by the control setting value setting unit 8 having higher COP compared to the frequency set in the second operating mode to be described later. FIG. 5 to be described later is a diagram showing a relation between the return hot water temperature and the COP corresponding to each compressor frequency. As shown in FIG. 5, frequencies having high COP for the compressor 201 are lower than the rated frequency. Thus, operation is performed with a smaller heat supply quantity compared to operation at the rated frequency.

When the "first operating mode" is started, processing proceeds to S18→"END"→"START" S11→S12. At S12, the operation switching unit 3 compares the "tank water temperature" with the "water heating completion temperature". The "water heating completion temperature" is 60° C., for example, as shown in FIG. 3.

In this case, the operation switching unit 3 determines whether a state "tank water temperature"≥60° C. has continued for a predetermined period of time. Upon start of the "first operating mode", this state has not normally continued so that processing proceeds to S14. If a rise in the tank temperature equal to or exceeding a predetermined threshold is observed in tank temperature values detected over a predetermined period of time (NO at S14), processing proceeds to S17 again. The period of time for determining continuation and the threshold for determining a rise in the temperature are set in the operation switching determination value setting unit 6.

<S18: Second Operating Mode>

When the tank temperature reaches the operation switching determination value (40° C.) (NO at S17), the operation switching unit 3 switches to the "second operating mode" (S19). The "second operating mode" is an operating mode in which water heating is accelerated. In the first operating mode, operation is performed with a small heat supply quantity so that the water temperature rises slowly. Thus, upon entering the "second operating mode", there is a large deviation of the tank water temperature from the water heating completion temperature, so that operation is performed by raising the compressor frequency to the rated or upper limit frequency or the frequency set in the control setting value setting unit 8 which is higher than the frequency in the first operating mode. The operating frequency is increased here, so that the COP of the heat source device is reduced.

When the second operating mode is started at S19, processing proceeds from S19→"END"→"START"→S11→S12. As a result of operation in the "second operating mode", if the tank water temperature reaches the water heating stop temperature (60° C.) and continues in that state for a predetermined period of time (YES at S12), the operation switching unit 3 determines that water heating has completed and stops operation or switches to the room heating operation (S13). Then, processing proceeds from S13 "END"→"START"→S11→S16→S20.

On the other hand, if the water heating completion temperature (60° C.) has not been reached (NO at S12) and the tank temperature remains without increase for a predetermined period of time (YES at S14), the operation switching unit 3 determines that the heat source device 20 has inadequate capability, activates the auxiliary heater (auxiliary heat source 22), and continues operation until the water heating stop temperature is reached (S15).

Figure 4:
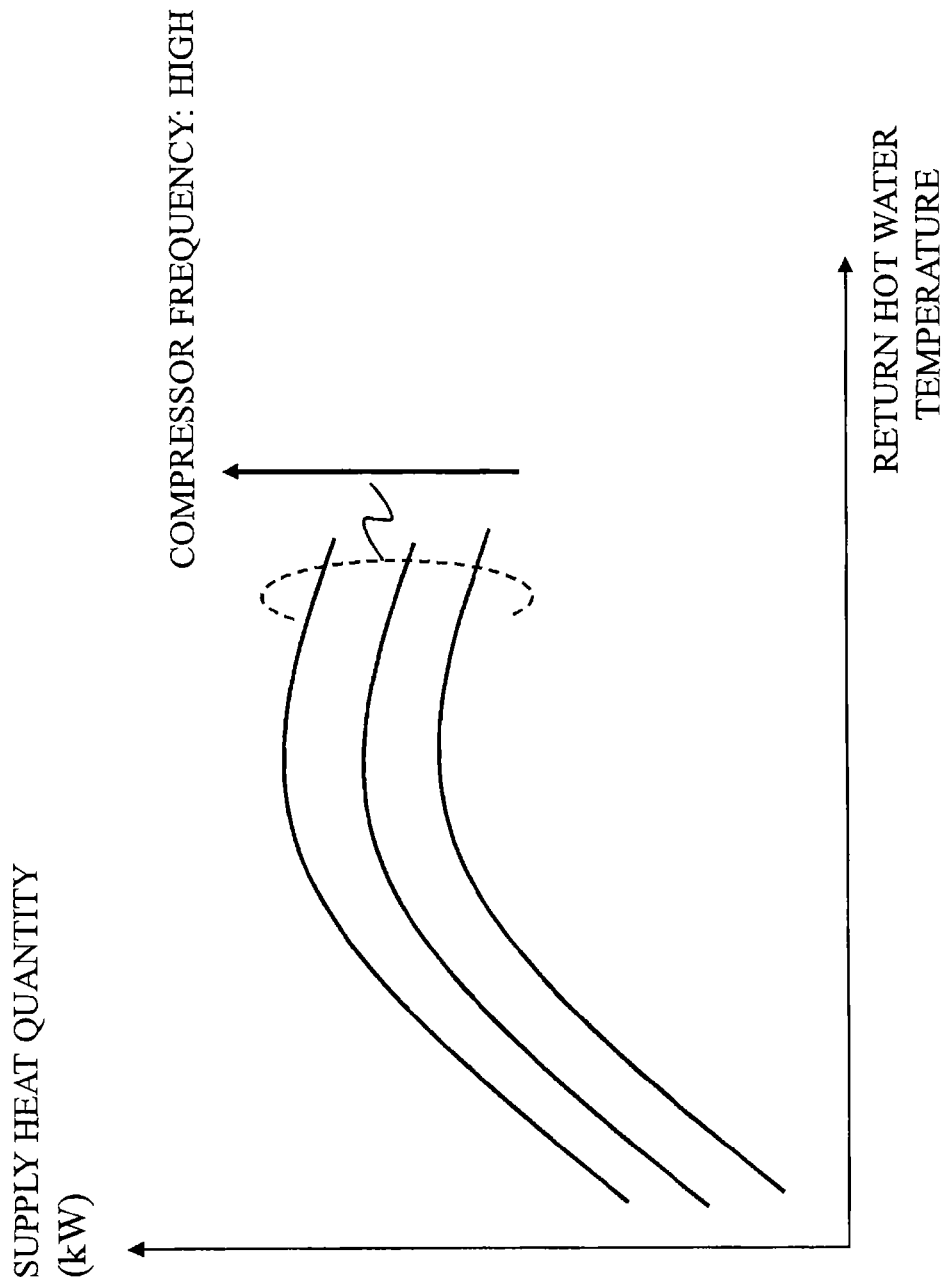
FIG. 4 is a diagram showing a relation between a return hot water temperature and a supply heat quantity corresponding to each compressor frequency of a heat source device in the first embodiment.

FIG. 4 is a diagram showing a relation between the return hot water temperature and the supply heat quantity corresponding to each compressor frequency of the heat source device 20. In FIG. 4, the higher the graph line is, the higher the compressor frequency corresponding to that line.

FIG. 5 is a diagram showing a relation between the return hot water temperature and the COP corresponding to each compressor frequency of the heat source device 20. In FIG. 5, the higher the graph line is, the lower the compressor frequency corresponding to that line.

Figure 6:
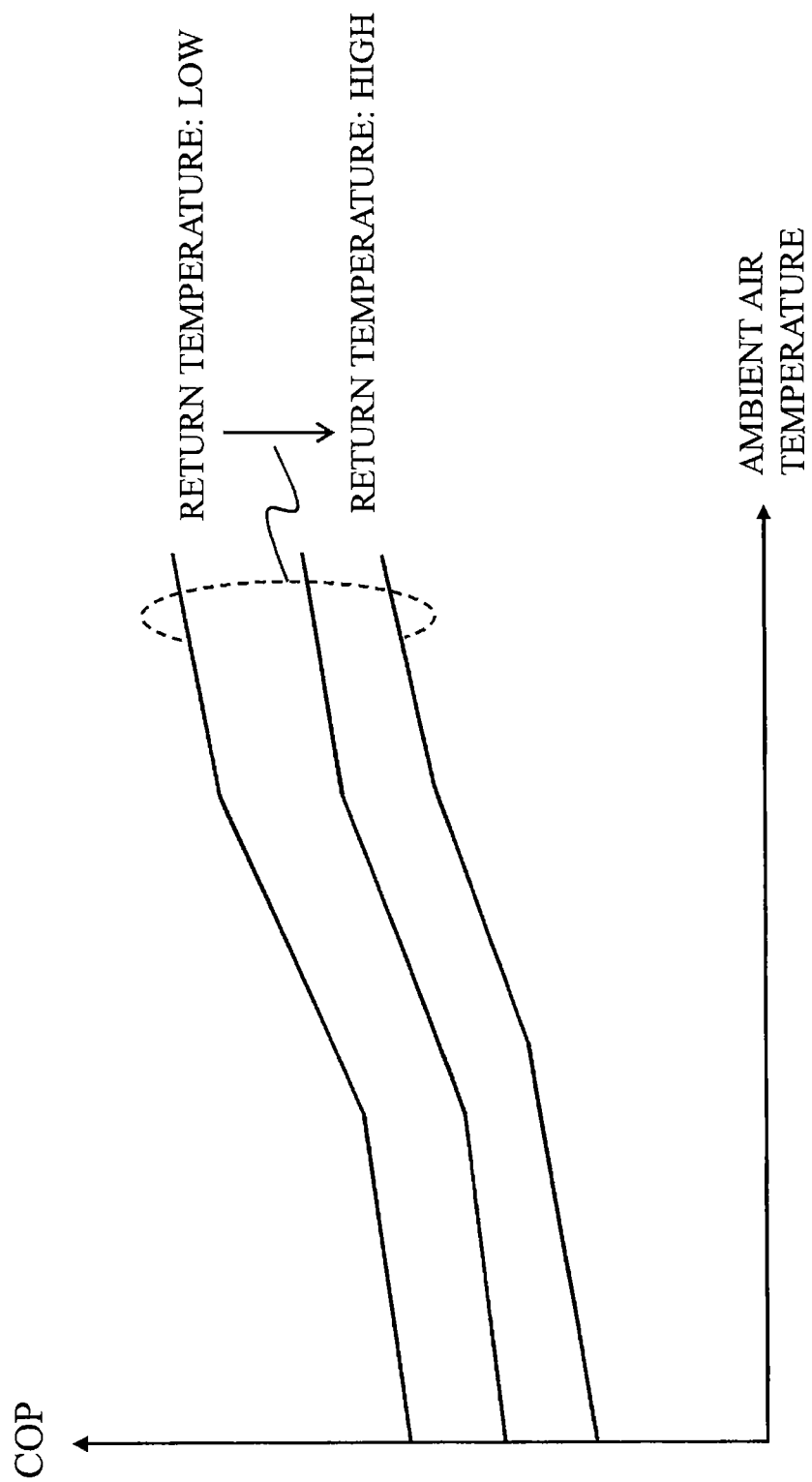
FIG. 6 is a diagram showing a relation between an ambient air temperature and the COP corresponding to each return hot water temperature in the first embodiment.

FIG. 6 is a diagram showing a relation between the ambient air temperature and the COP corresponding to each return hot water temperature. In FIG. 6, the lower the graph line is, the higher the return temperature corresponding to that line.

Referring to FIGS. 4 and 5, differences in operation performance from the conventional method will now be described. FIGS. 4 and 5 are image diagrams showing the supply heat quantity and COP characteristics in relation to the return hot water temperature corresponding to each compressor frequency.

(1) Differences in the COP according to the compressor frequency are large in a lower range of the return hot water temperature and small in a higher range.

Figure 7:
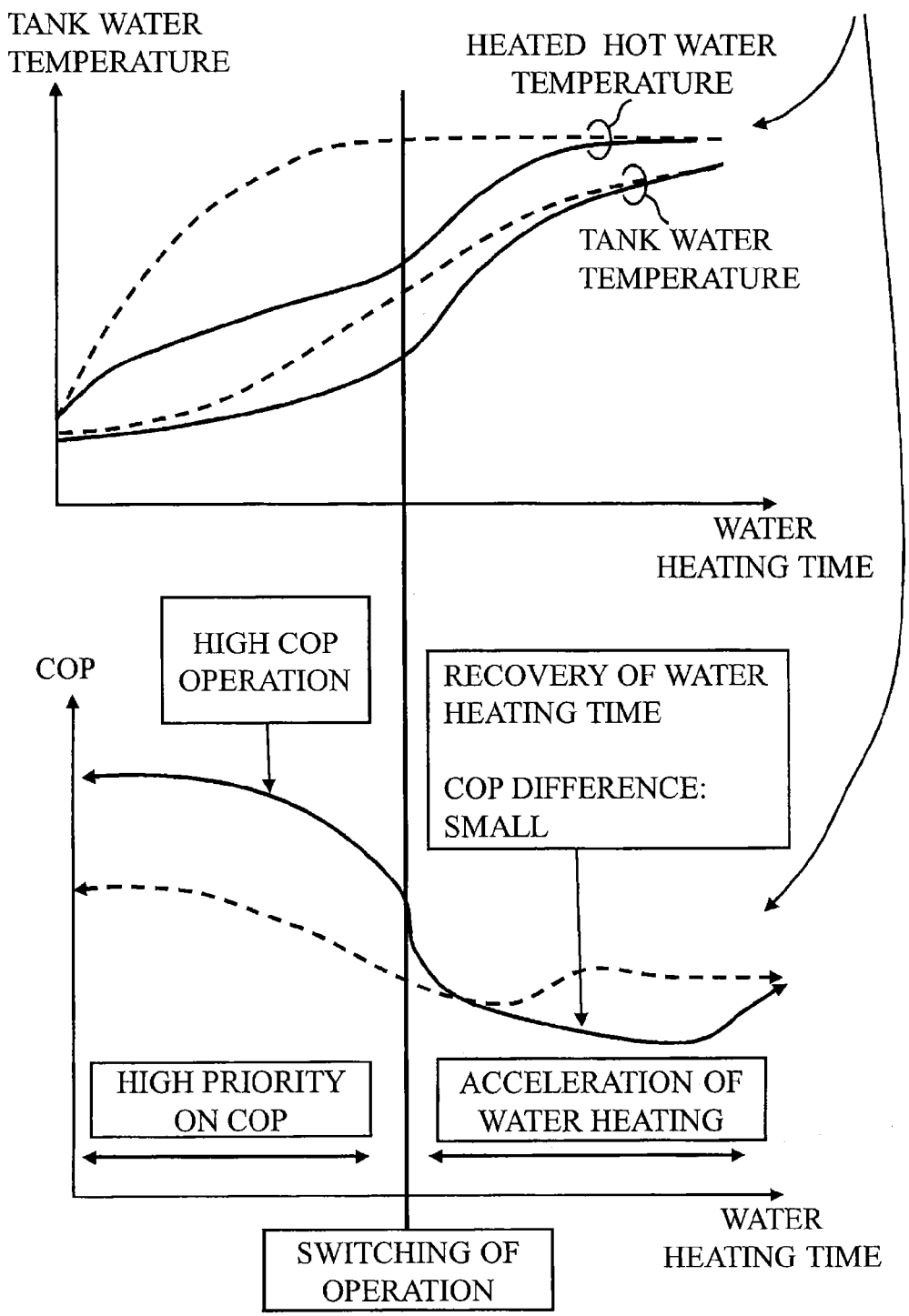
FIG. 7 is a diagram showing characteristics of a water heating operation of the heat pump hot water supply system 1000 in the first embodiment.

FIG. 7 shows changes in the water temperature and the COP in the heat pump hot water supply system 1000 of the first embodiment, based on the characteristics shown in FIGS. 4 and 5 and assuming that the water heating time is the same as the conventional water heating time. In graphs of FIG. 7, dotted lines represent the conventional system and solid lines represent the heat pump hot water supply system 1000.

As shown in FIG. 7, in comparison of the conventional operation and the operation by the heat pump hot water supply system 1000, when the operation switching determination values are respectively set to result in the same water heating time:

(1) in the "first operating mode" placing higher priority on the COP, there are large differences in the COP depending on differences in the frequency, and the COP is greatly enhanced by operating at a fixed low frequency. On the other hand, the supply heat quantity is small and the tank water temperature rises slowly.

(2) Accordingly, the "second operating mode" that accelerates water heating is used to raise the tank water temperature more rapidly. In the "second operating mode", depending on a deviation of the tank water temperature from the water heating target temperature and the amount of change in the deviation, the frequency is raised or lowered so as to reduce the deviation.

While the deviation is large, operation to raise the frequency is continued, so that the frequency is raised to the rated or upper limit frequency in a short period of time, accelerating the water heating operation.

The "second operating mode" operates at a higher frequency, so that the COP is reduced compared to the conventional method. However, at this temperature range, the COP varies to a small degree with different frequencies.

As a result, a portion of the COP improved in the "first operating mode" is greater than a portion of the COP reduced in the "second operating mode", thereby improving the average COP during the water heating period.

In the indirect heating method, a rate of rise of the tank water temperature is determined based on the strength of natural convection due to a difference in the tank water temperature. During operation in the second operating mode, the temperature rises faster than upon start of operation when no convection has yet occurred. When the tank target temperature is close to the upper limit of the hot water outlet temperature, the operation time is increased with the conventional method because the upper limit of the hot water temperature restrains performance. In the case of switching from the first operating mode to the second operating mode, the hot water temperature is still below the upper limit at the time of switching the operating mode and there is still capacity to increase the supply heat quantity. Thus, a shorter extension of the water heating time is required compared to operation with the conventional method. Therefore, the COP can be improved while maintaining a risk of running out of hot water at the same level as the conventional method.

In the first embodiment, an example of operation at the fixed compressor frequency with the high COP has been described as the "first operating mode". However, another operating mode may be used in which the difference between the tank water temperature and the heated or return hot water temperature is maintained constant, or a product of the difference between heated and return hot water temperatures multiplied by the flow of the circulation pump is maintained constant. When the circulation pump is operated at a fixed speed, the difference between heated and return hot water temperatures may be maintained constant without using the flow of the circulation pump Any of these modes allows management of the quantity of heat supplied from the hot water to the tank. Thus, it is possible to subdue rising of the hot water temperature such that there will not be an increased difference between the heat quantity the hot water receives from the hot water exchanger 202 and the heat quantity the hot water supplies to the tank, thereby improving the COP.

By using the above operating modes, in the heat pump hot water supply system of the indirect heating method, the water heating operation can be performed with improved COP while maintaining the water heating time equivalent to that of the conventional system.

According to the heat pump hot water supply system 1000 of the first embodiment, upon start of the water heating operation, the first operating mode is used to maintain the compressor frequency in a lower range so as to subdue rising of the hot water temperature until the rate of rise of the tank water temperature increases. As a result, the COP of the heat source device is improved. Further, after switching from the first operating mode to the second operating mode, the hot water temperature is raised promptly by the deviation from the tank water temperature. Accordingly, the tank water temperature also rises rapidly, so that there is no need to extend the water heating time. Thus, the average COP during the water heating period can be improved without extending the water heating time.

Second Embodiment

Figure 8:
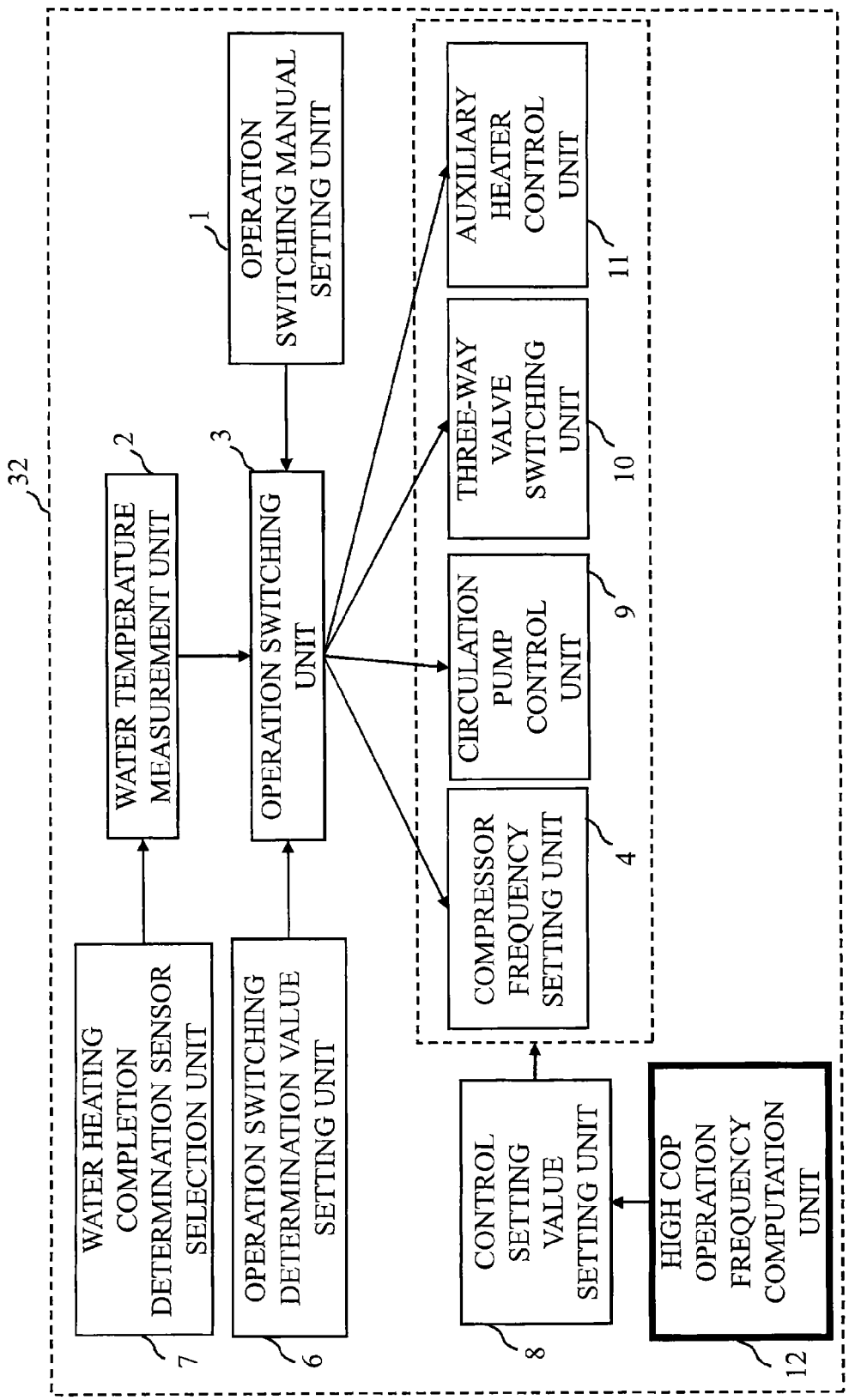
FIG. 8 is a configuration diagram of a system controller 32 in a second embodiment.

FIG. 8 is a configuration diagram of the system controller 32 in a second embodiment. The system controller 32 of the second embodiment is characterized in that a high COP operation frequency computation unit 12 is further included. In the system controller 32 of the second embodiment, the operation switching unit 3 and the high COP operation frequency computation unit 12 constitute an operation control unit.

(High COP Operation Frequency Computation Unit 12)

The high COP operation frequency computation unit 12 stores characteristics data as shown in FIGS. 4 to 6 for each frequency of the compressor 201. For example, when given the return hot water temperature as an input, the high COP operation frequency computation unit 12 computes an operating frequency with the highest COP based on an approximate formula of the characteristics data (an example of correspondence relation information) shown in FIGS. 4 to 6.

Alternatively, a lower limit capability value in the first operating mode may be set in the control setting value setting unit 8. Then, based on the return temperature to the heat source device 20 and the ambient air temperature upon start of operation, an operating frequency with the highest COP above the lower limit capability value may be obtained by an approximate formula of the characteristics data shown in FIGS. 4 to 6.

With this operating method, when the "first operating mode" placing higher priority on the COP is selected, the operation switching unit 3 operates at the operating frequency with the highest COP computed by the high COP operation frequency computation unit 12 based on the return hot water temperature.

By using the above operating method, in the first operating mode, the operation switching unit 3 operates by automatically selecting the frequency with the highest COP computed by the high COP operation frequency computation unit 12. As a result, the COP can be improved highly effectively by the first operating mode.

Third Embodiment

Figure 9:
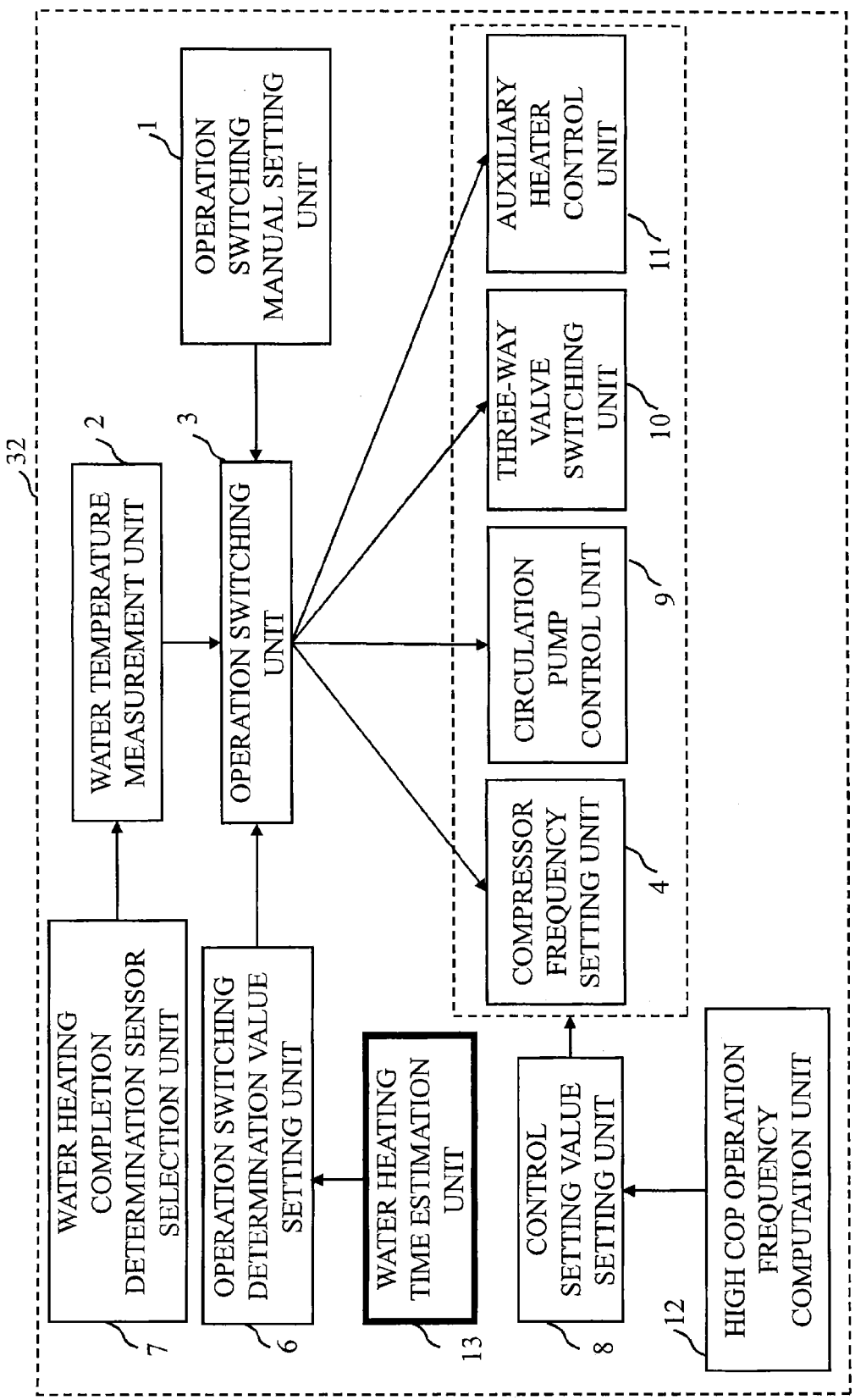
FIG. 9 is a configuration diagram of the system controller 32 in a third embodiment.

FIG. 9 shows an operating method of the heat pump hot water supply system in a third embodiment. In comparison with the configuration of the second embodiment, the system controller 32 further includes a water heating time estimation unit 13. The water heating time estimation unit 13 estimates water heating time to achieve a target tank water temperature. In the system controller 32 of the third embodiment, the operation switching unit 3 and the water heating time estimation unit 13 constitute an operation control unit.

Figure 10:
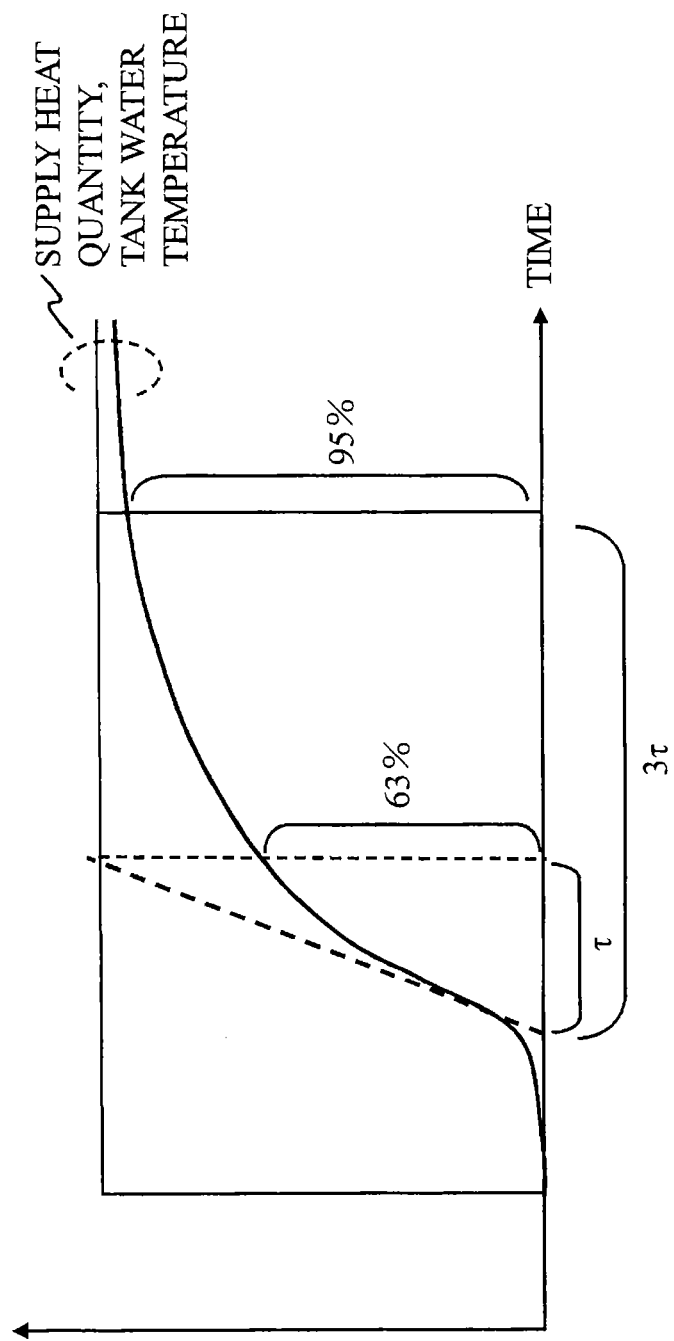
FIG. 10 is a diagram explaining characteristics of first order lag in the third embodiment.

FIG. 10 is a diagram explaining first order lag characteristics in the third embodiment. As shown in FIG. 10, the tank water temperature changes with characteristics mainly due to dead time and first order lag.

A time constant can be obtained by computing water heating time on the following assumption: a constant supply heat quantity operation (an example of a water heating time estimation operation) is performed, during which the temperature difference between the heated hot water and the return hot water in the water heat exchanger 202 and their respective flows are maintained constant, and after operation is continued for a few minutes with the same supply heat quantity, a slope of the water temperature rising characteristic stabilizes, and with this slope the water temperature rises to the target temperature.

After the time constant, $\tau$ seconds, due to the first order lag elapses, 63% of the target value is attained. After $3\tau$ seconds, 95% is attained. Thus, based on the time $3\tau$ seconds, it is possible to estimate the time to complete water heating at the current supply heat quantity.

The operation switching unit 3 switches the operating mode by using an estimated water heating time T (estimation) computed by the water heating time estimation unit 13, a target water heating time T (target) set by the operation switching determination value setting unit 6, and an allowable error $\Delta T$ of the water heating time.

If the estimated water heating time T (estimation) is longer than the time obtained by adding the allowable error $\Delta T$ of the water heating time to the target water heating time T (target), that is, $T(\text{estimation}) > T(\text{target}) + \Delta T$, then the operation switching unit 3 switches to the "second operating mode" placing higher priority on the water heating time. If the estimated water heating time is shorter than the time obtained by subtracting the allowable error $\Delta T$ of the water heating time from the target water heating time T (target), that is, $T(\text{estimation}) < T(\text{target}) - \Delta T$, then the operation switching unit 3 operates in the "first operating mode" placing higher priority on the COP.

That is, when the target water heating time T (target) for the hot water storage tank water to reach a predetermined water heating temperature is specified for the heat pump hot water supply system 1000, the system controller 32 executes the water heating time estimation operation on the heat pump hot water supply system 1000 on a predetermined timing basis. The water heating time estimation operation estimates the time for the hot water storage tank water to reach the water heating temperature. In this way, the system controller 32 computes the estimated water heating time T (estimation) (estimated water heating time value) required to reach the water heating temperature. Based on the computed estimated water heating time T (estimation) and the specified target water heating time T (target), the system controller 32 operates the heat pump hot water supply system 1000 in either the "first operating mode" focusing on the COP of the heat source device 20 or the "second operating mode" focusing on elevation of the water temperature of the hot water storage tank.

By using the operating method of the third embodiment, the high COP operation can be inserted while adjusting the water heating time as appropriate to approach the target value. As a result, the water heating operation with a high average COP can be realized by automatic operation while maintaining the water heating time.

In the operating method of the third embodiment, operation is performed by adjusting a COP priority operation and a water heating time priority operation as appropriate in accordance with the estimated water heating time obtained based on the temperature change characteristics. Thus, while maintaining the water heating time, the water heating operation with a high average COP can be performed without setting values that depend on know-how.

Fourth Embodiment

Referring to FIGS. 11 to 14, a fourth embodiment will be described. The system configuration of the fourth embodiment is the same as that of the first embodiment shown in FIG. 1. In the fourth embodiment, as indexes for estimating the heat transfer efficiency of the second heat exchanger 29, attention is focused on amounts of change per time of both the temperature of the return hot water to the heat source device 20 and the tank water temperature. The return hot water to the heat source device 20 is the circulating hot water (second refrigerant) that flows into the water heat exchanger 202 in the water circuit 21 as indicated by an arrow 41 in FIG. 1.

Figure 11:
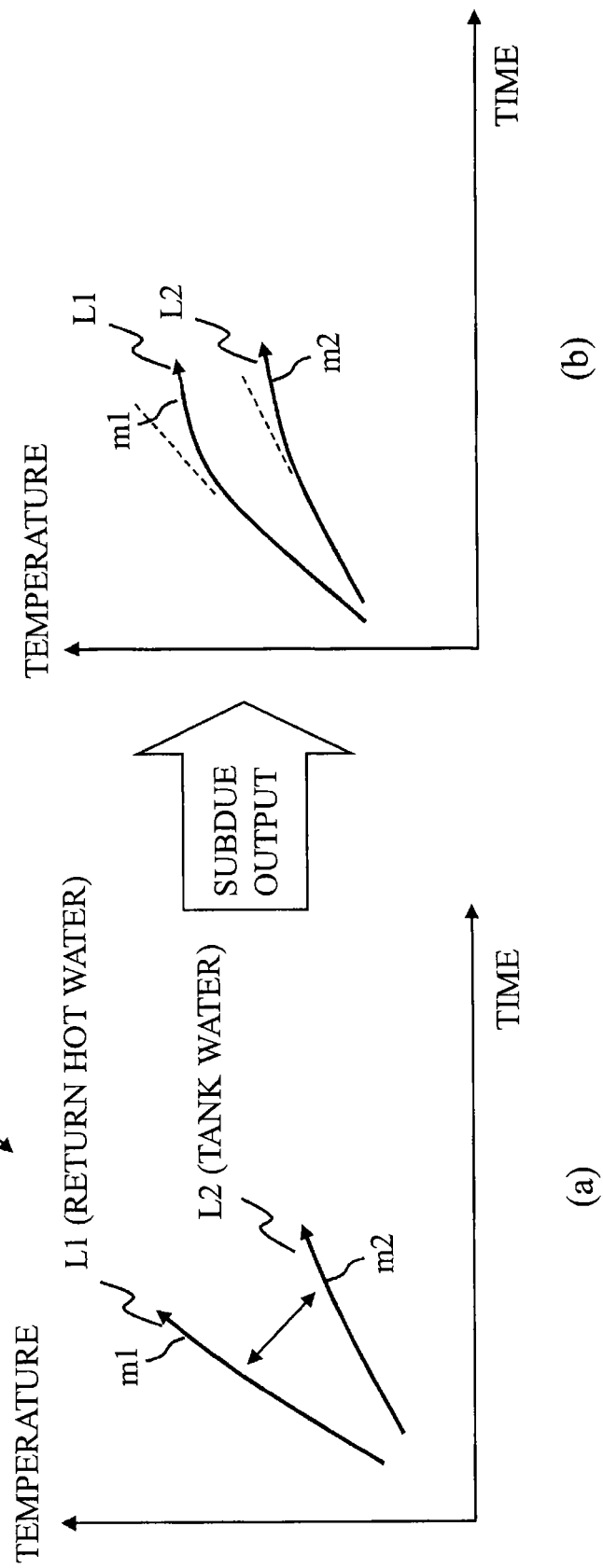
FIG. 11 is a diagram showing a slope of the return hot water temperature and a slope of a tank water temperature when heat transfer efficiency is low in a fourth embodiment.

In FIG. 11, (a) shows a return hot water temperature L1 and a tank water temperature L2 when the heat transfer efficiency of the second heat exchanger 29 is low. In (a), the horizontal axis represents time and the vertical axis represents temperature. "L1" indicates a graph of the return hot water temperature, and "L2" indicates a graph of the tank water temperature L2. "m1" indicates a slope of the graph of the return hot water temperature L1, and "m2" indicates a slope of the graph of the tank water temperature L2. That is, the slope m1 and the slope m2 show temperature changes per unit time corresponding to the return hot water temperature L1 and the tank water temperature L2, respectively.

In FIG. 11, (b) is a diagram showing the return hot water temperature L1 and the tank water temperature L2 after output of the heat source device 20 is subdued.

Figure 12:
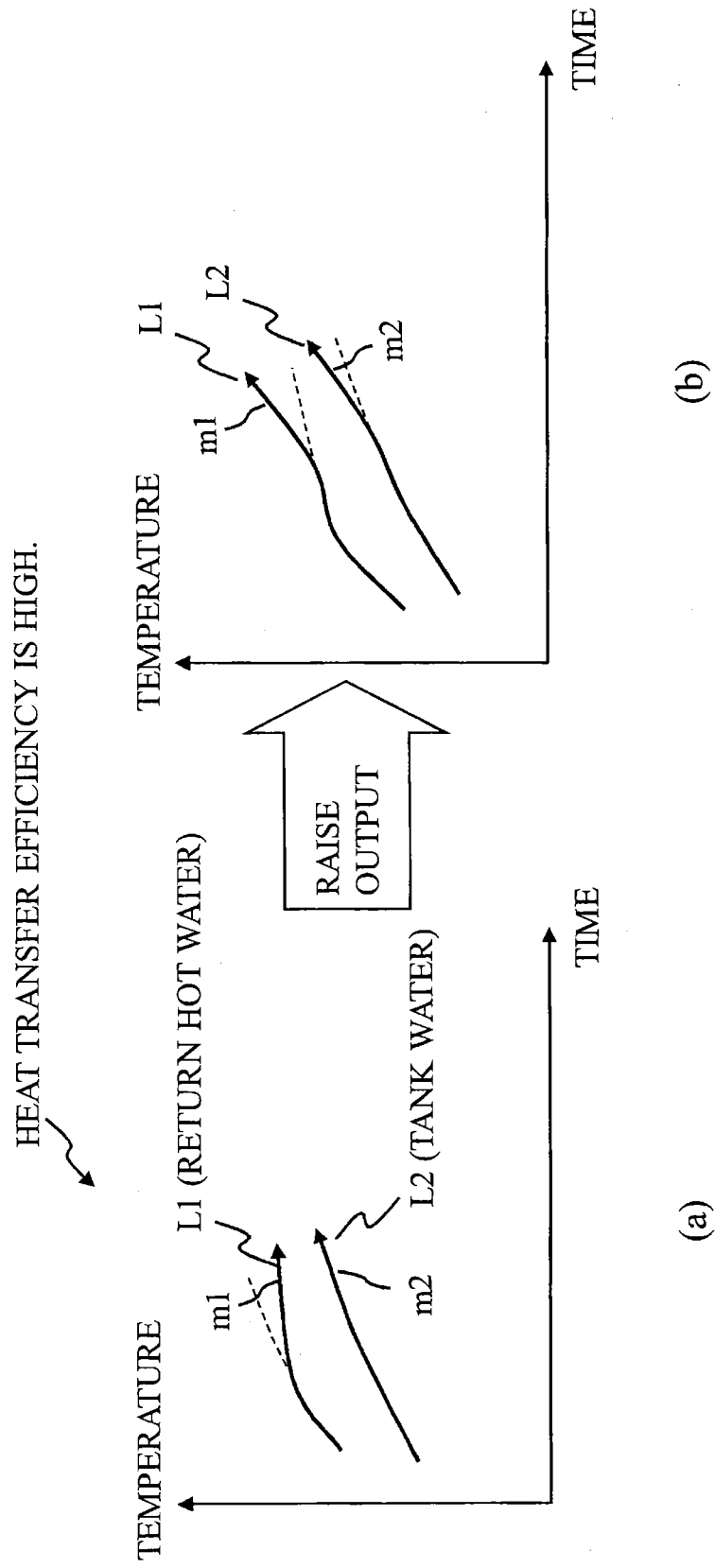
FIG. 12 is a diagram showing a slope of the return hot water temperature and a slope of the tank water temperature when the heat transfer efficiency is high in the fourth embodiment.

In FIG. 12, (a) shows the return hot water temperature L1 and the tank water temperature L2 when the heat transfer efficiency of the second heat exchanger 29 is high.

In FIG. 12, (b) is a diagram showing the slopes m1 and m2 of the return hot water temperature L1 and the tank water temperature L2 after the output of the heat source device 20 is raised. In FIG. 12, (a) and (b) correspond to (a) and (b) of FIG. 11.

As shown in (a) of FIG. 11, when the heat transfer efficiency of the second heat exchanger 29 is low, the quantity of heat released from the circulating hot water is small. Thus, the amount of change per time of the return hot water temperature (slope m1) is greater than the amount of change per time of the tank water temperature L2 (slope m2).

That is, when the heat transfer efficiency of the second heat exchanger 29 is low, slope m1>slope m2.

On the other hand, when the heat transfer efficiency of the second heat exchanger 29 improves as shown in (a) of FIG. 12, a larger quantity of heat is released from the circulating hot water, resulting in a decreased difference between the return hot water temperature and the tank water temperature. That is, when the heat transfer efficiency of the second heat exchanger 29 is high, the amount of change per time of the return hot water temperature (slope m1) is smaller than the amount of change per time of the tank water temperature L2 (slope m2) as shown in (a) of FIG. 12.

That is, when the heat transfer efficiency of the second heat exchanger 29 is high, slope m1<slope m2.

The operation switching unit 3 (operation control unit) of the system controller 32 obtains the amounts of change per time in the return hot water temperature L1 and the tank water temperature L2 (slope m1, slope m2) as shown in (a) of FIG. 11 and (a) of FIG. 12, based on detected values of each sensor obtained by the water temperature measurement unit 2. The return hot water temperature is detected by the return hot water temperature sensor 34, and the tank water temperature is detected by the tank water temperature sensor 35. As to the amounts of change per time which are the slopes m1 and m2, the operation switching unit 3 obtains temperature deviations based on measured values per minute, for example. Upon start of operation or the like, values vary due to stagnant water in a circulation path (water circuit 21) and so on. For this reason, the operation switching unit 3 may be configured to store measured values in several previous measurements taken upon start of operation, and obtain the amount of change per time upon start of operation by applying a least-square method, a moving-average method or the like to these measure values.

When the amount of change per time of the return hot water temperature (slope m1) is greater than the amount of change per time of the tank water temperature (slope m2) as shown in (a) of FIG. 11, the operation switching unit 3 determines that the heat transfer efficiency of the second heat exchanger 29 is low. In this case, the operation switching unit 3 changes control from (a) to (b) of FIG. 11. When the heat transfer efficiency is low, the operation switching unit 3 operates by lowering the output of the heat source device 20 so as to make the slope m1 and the slope m2 resemble each other as shown in (b) of FIG. 11. On the other hand, when the amount of change per time of the tank water temperature (slope m2) is greater than the amount of change per time of the return hot water temperature (slope m1) as shown in (a) of FIG. 12, the operation switching unit 3 determines that the heat transfer efficiency of the second heat exchanger 29 is high. Then, the operation switching unit 3 changes control from (a) to (b) of FIG. 12. That is, when the heat transfer efficiency is high, the operation switching unit 3 operates by raising the output of the heat source device 20 so as to make the slope m1 and the slope m2 resemble each other as shown in (b) of FIG. 12.

As described above, by controlling the heat source device 20 depending on the amounts of change per time of the return hot water temperature and the tank water temperature, it is possible to subdue the rising of the temperature of the return hot water to the heat source device which is caused when the heat transfer efficiency is low. As a result, the heat source device 20 can be operated with the improved COP.

When hot water supply is performed over a prolonged period of time while the heat transfer efficiency is low and the output of the heat source device 20 is subdued (control from (a) to (b) of FIG. 11), the tank water cannot be heated in time, resulting in an increased risk of running out of hot water in general. However, according to the above-described method, the "risk of running out of hot water" can be avoided because of the reason to be described below.

Figure 13:
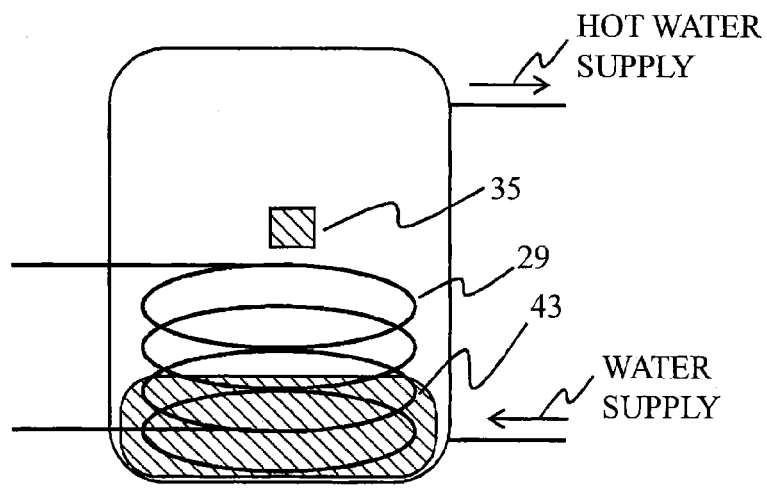
FIG. 13 is a schematic diagram showing an internal view of a hot water storage tank 25 in the fourth embodiment.

FIG. 13 is a schematic diagram showing an internal view of the hot water storage tank 25.

Figure 14:
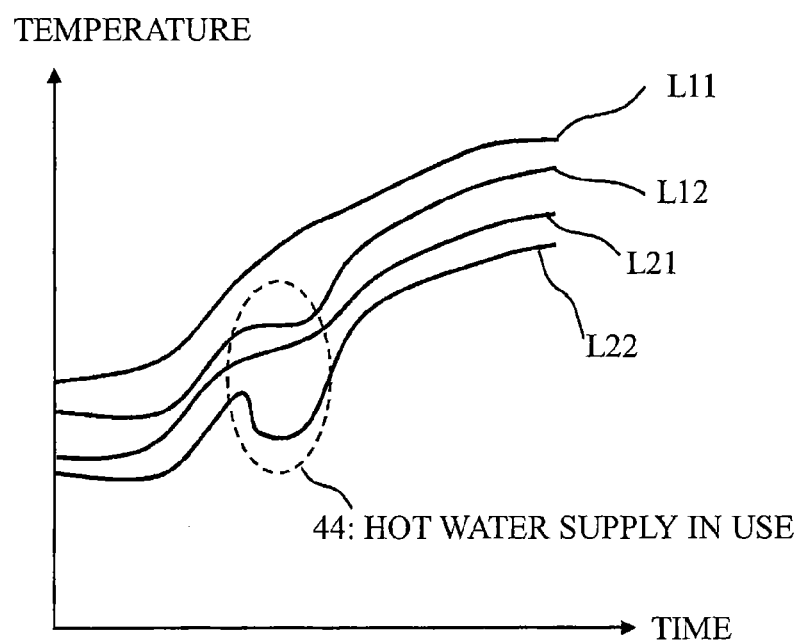
FIG. 14 is a diagram showing a second refrigerant temperature and a water temperature in the hot water storage tank 25 in the fourth embodiment.

FIG. 14 is a graph showing changes per time of the heated hot water temperature L11, the return hot water temperature L12 and so on. In FIG. 14, "L11" and so on denote the following:

(1) "L11" represents the "heated hot water temperature". The "heated hot water" is the circulating hot water (second refrigerant) that flows out from the water heat exchanger 202 in the water circuit 21 as indicated by an arrow 42 in FIG. 1.
(2) "L12" represents the "return hot water temperature". The "return hot water" refers to the circulating hot water (second refrigerant) that flows into the water heat exchanger 202 in the water circuit 21 as indicated by the arrow 41 in FIG. 1.
(3) "L21" represents the tank water temperature. The tank water temperature L21 is the tank water temperature detected by the tank water temperature sensor 35 located at approximately the middle of the hot water storage tank 25 as shown in FIG. 13. The tank water temperature sensor 35 of FIG. 13 is located above the second heat exchanger 29.
(4) "L22" represents the tank water temperature at a lower portion (a range 43 which is shaded in FIG. 13) of the hot water storage tank 25.
(5) A range 44 enclosed in a dashed circle indicates a period when hot water supply is used.

When hot water supply is performed, the water temperature at the lower portion (range 43 of FIG. 13) of the hot water storage tank 25 decreases as shown by the tank water temperature L22 in the range 44 of FIG. 14. However, when the tank water temperature sensor 35 is located above the second heat exchanger 29 as the tank water temperature sensor 35 of FIG. 13, the decrease in the tank water temperature is not immediately detected, resulting in a time lag before it can be confirmed that hot water supply is being performed. On the other hand, in a part of the second heat exchanger 29, the heat transfer amount increases because of cold water supplied to the lower portion (range 43) of the hot water storage tank 25 as a result of hot water supply, so that the return hot water temperature decreases. The increase in the heat transfer amount here is caused by a significant increase in the heat transfer efficiency caused by an increased temperature difference between the circulating hot water and the hot water storage tank water as well as forced convection caused by water supply, and this change appears promptly. As a result, based on the relation between the return hot water temperature L12 and the tank water temperature L21 in the range 44 of FIG. 14, the slope m1 of the circulating hot water temperature (return hot water temperature 12) is lowered. Accordingly, to restore the slope m1, the operation switching unit 3 changes control from (a) to (b) of FIG. 12, and operates by raising the output of the heat source device 20. Thus, the operation switching unit 3 operates by raising the output of the heat source device 20 before a result of hot water supply appears as a change in the tank water temperature, so that the risk of running out of hot water can be prevented from being increased.

In the description of FIGS. 11 and 12, the slope m1 is obtained based on the temperature of the second refrigerant (return hot water) flowing into the water heat exchanger 202, and the output of the heat source device 20 is controlled based on comparison of the change per time of the return hot water temperature (slope m1) and the change per time of the tank water temperature (slope m2). Alternatively, the slope m1 of the heated hot water may be obtained based on the temperature of the second refrigerant (heated hot water) flowing out of the water heat exchanger 202 in place of the change in the return hot water temperature, and the output of the heat source device 20 may be controlled based on comparison of the change per time of the heated hot water temperature (slope m1) and the change per time of the tank water temperature (slope m2).

In the fourth embodiment, the heat source device 20 is controlled by using the amount of change per time of the return hot water (or the heated hot water) (slope m1) and the amount of change per time of the tank water temperature (slope m2). However, the operation switching unit 3 may control the output of the heat source device 20 based on the temperature of the second refrigerant (either the return hot water temperature or the heated hot water temperature may be used) and the tank water temperature. For example, the operation switching unit 3 may execute control such that the output of the heat source device 20 is lowered when the temperature difference increases between the return hot water (or the heated hot water) and the tank water temperature, and the output of the heat source device 20 is raised when the temperature difference decreases.

Fifth Embodiment

Figure 15:
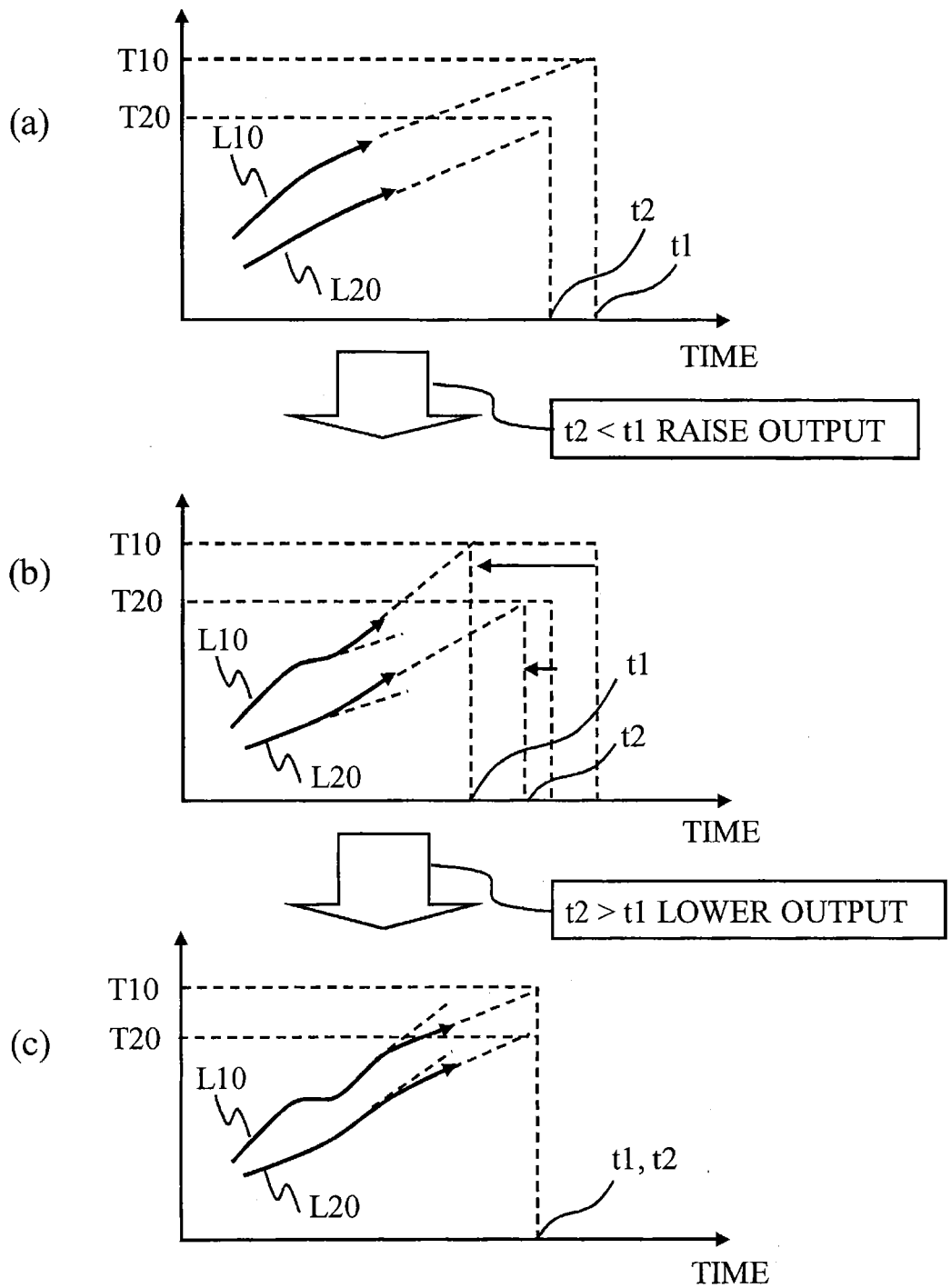
FIG. 15 is a diagram showing estimated arrival times t1 and t2 in a fifth embodiment.

Referring to FIG. 15, a fifth embodiment will be described. The system configuration of the fifth embodiment is the same as that of the first embodiment shown in FIG. 1. The fifth embodiment is an embodiment in which the operation switching unit 3 controls the operating frequency of the compressor 201 so as to achieve equality between "estimated arrival time of the second refrigerant to an upper limit temperature" and "estimated arrival time of the tank water temperature to a target temperature" to be described later.

FIG. 15 is a diagram showing control by the operation switching unit 3 in the fifth embodiment.

In (a), (b), and (c) of FIG. 15,
(1) "L10" is a graph showing a temperature change of the second refrigerant (heated hot water indicated by the arrow 42 in FIG. 1).
(2) "L20" is a graph showing a change in the tank water temperature.
(3) "T10" represents the upper limit temperature (setting value) of the second refrigerant.
(4) "T20" represents the target temperature (setting value) of the tank water temperature.
(5) "t1" is the estimated arrival time for the second refrigerant temperature to reach the upper limit temperature T10 when the origin "0" is used as reference time. "t1" may also be referred to as the estimated arrival time to the second refrigerant upper limit temperature.
(6) "t2" is the estimated arrival time for the tank water temperature to reach the target temperature T20 when the origin "0" is used as reference time. "t2" may also be referred to as the estimated arrival time to the hot water storage tank target temperature.

When the estimated arrival time to the second refrigerant (heated hot water) upper limit temperature (may also be referred to as the origin to time t1, or simply as t1) is long, the second refrigerant temperature transitions at a lower range, thereby improving the COP but increasing the water heating time. On the other hand, when the estimated arrival time to the second refrigerant (heated hot water) upper limit temperature is short, the second refrigerant temperature transitions at a higher range, thereby shortening the water heating time but reducing the COP. The "upper limit temperature" of the second refrigerant is a value set to the operation switching unit 3 by the operation switching determination value setting unit 6, the operation switching manual setting unit 1 or the like, and is a setting value which is the upper limit temperature of the heated hot water (arrow 42 of FIG. 1). The "estimated arrival time t1 to the upper limit temperature" is the time (period) for the heated hot water to reach the upper limit temperature T10 from the reference time (origin time of (a), (b), and (c) of FIG. 15). As described above, when the "estimated arrival time t1 to the upper limit temperature" is long, the water heating time is increased, and when the estimated arrival time t1 to the upper limit temperature" is short, the COP is reduced. Thus, considering a trade-off between the increased water heating time and the reduced COP, the operation switching unit 3 controls the output of the heat source device 20 so as to achieve equality between the "estimated arrival time t1 to the upper limit temperature" of the second refrigerant temperature (heated hot water temperature) and the estimated arrival time t2 to the target temperature T20 of the tank water temperature (may also be referred to as the origin to time t2 or simply as t2). The target temperature of the tank water temperature, that is, the "hot water storage tank target temperature T20" is a value set to the operation switching unit 3 by the operation switching determination value setting unit 6, the operation switching manual setting unit 1 or the like, and is the target temperature of the tank water temperature.

The operation switching unit 3 obtains the temperature change per unit time of the second refrigerant temperature (heated hot water temperature) (slope m1) and the temperature change per unit time of the tank water temperature (slope m2) by the method described in the fourth embodiment. Assuming similar amounts of change, the operation switching unit 3 estimates the "estimated arrival time t1 to the upper limit temperature" of the second refrigerant. When the estimated arrival time t1 of the second refrigerant temperature is not equal to the estimated arrival time t2 of the tank water temperature, the operation switching unit 3 adjusts the output of the heat source device 20.

In FIG. 15, (a) shows an instance where, as a result of estimation by the operation switching unit 3, the tank water temperature reaches the setting value faster than the second refrigerant, that is, when time t1>time t2.

When the tank water temperature thus reaches the setting value (hot water storage tank target temperature T20) faster, the operation switching unit 3 operates by raising the output of the heat source device 20 as shown in a transition from (a) to (b) of FIG. 15.

In FIG. 15, (b) shows an instance where, as a result of estimation by the operation switching unit 3, the second refrigerant reaches the setting value faster than the tank water temperature, that is, when time t2>time t1.

When the second refrigerant reaches the setting value (upper limit temperature T10) faster, the operation switching unit 3 operates by lowering the output of the heat source device 20 as shown in a transition from (b) to (c) of FIG. 15.

By the operating methods (a) and (b) of FIG. 15 of the heat source device 20, both the tank water temperature and the second refrigerant temperature are controlled to reach the respective setting values at the same time as shown in (c) of FIG. 15. By such control, there is no need to control the output in accordance with arrival of the second refrigerant temperature to the upper limit temperature. Thus, the heat source device 20 can be operated with little extension of the water heating time and the improved COP. When the second refrigerant temperature reaches the upper limit temperature T10, the operation switching unit 3 maintains the second refrigerant temperature at the upper limit temperature T10 by controlling the operating frequency of the compressor 201.

In the fourth and fifth embodiments, it has been described that the operation switching unit 3 controls the output of the heat source device 20 or the operation switching unit 3 adjusts the output of the heat source device 20. More specifically, "controlling the output of the heat source device 20" or "adjusting the output of the heat source device 20" means that the operation switching unit 3 controls the operating frequency of the compressor 201.

Sixth Embodiment

Figure 16:
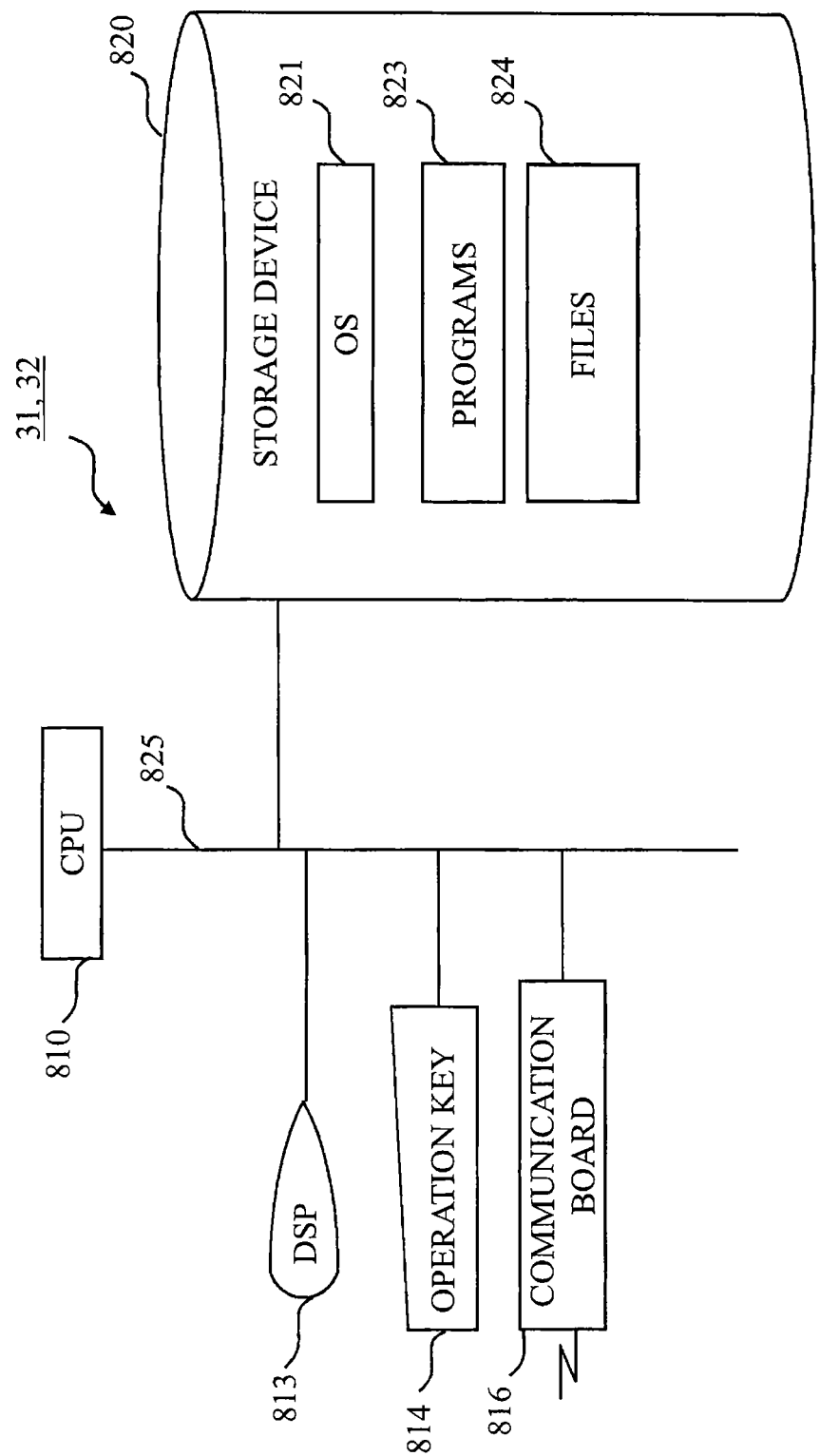
FIG. 16 is a diagram showing a hardware configuration of the system controller 32 in a sixth embodiment.

Referring to FIG. 16, a sixth embodiment will be described. The sixth embodiment relates to a hardware configuration of the system controller 32. The heat source device controller 31 has a similar hardware configuration as the hardware configuration of the system controller 32. Alternatively, the system controller 32 and the heat source device controller 31 may be implemented as a single computer having the hardware configuration of FIG. 16.

In FIG. 16, the system controller 32 includes a CPU 810 (Central Processing Unit) that executes programs. The CPU 810 is connected with a display device 813, an operation key 814, a communication board 816, and a storage device 820 via a bus 825, and controls these hardware devices. The storage device 820 is configured with one or more of a ROM (Read Only Memory), a RAM (Random Access Memory), a flash memory, and a magnetic disk device.

The communication board 816, the operation key 814 and so on are examples of an input unit or an input device. The communication board 816, the display device 813 and so on are examples of an output unit or an output device. The communication board 816 exchanges data with a remote controller wirelessly.

The storage device 820 stores an operating system 821 (OS), programs 823, and files 824. The programs 823 are executed by the CPU 810 and the operating system 821.

The programs 823 stores programs that execute functions described as " . . . unit" in the description of the embodiments above. The programs are read and executed by the CPU 810.

The files 824 store, as each item of " . . . file" and " . . . database", information, data, signal values, variable values, and parameters described as "determination result of . . . ", "computation result of . . . ", "extraction result of . . . ", "generation result of . . . ", and "processing result of . . . " in the description of the embodiments above. The information, data, signal values, variable values, and parameters stored in the storage device are read by the CPU 810 to a main memory or a cache memory via a read/write circuit, and are used for operations of the CPU such as extraction, search, reference, comparison, operation, computation, processing, output, printing, and display. During operation of the CPU such as extraction, search, reference, comparison, operation, computation, processing, output, printing, and display, the information, data, signal values, variable values, and parameters are temporarily stored in the main memory, the cache memory, or a buffer memory.

In the description of the first embodiment above, data and signal values are stored in a storage medium of the storage device 820. The data and signals are transferred online by the bus 825, a signal line, a cable, and other transfer media.

What is described as " . . . unit" in the description of the embodiments above may be " . . . means", " . . . circuit", or " . . . equipment" and may also be " . . . step", " . . . procedure", or " . . . process". That is, what is described as " . . . unit" may be implemented by firmware stored in the ROM. Alternatively, " . . . unit" may be implemented solely by software or solely by hardware such as an element, a device, a board, wiring and so on or a combination of software and hardware or a combination further including firmware. That is, a program makes a computer function as the " . . . unit" described above, or makes the computer execute a procedure or method of the " . . . unit" described above.

In the above embodiments, the system controller 32 has been described. The actions of the system controller 32 may be interpreted as a hot water supply system control program to be executed by a computer, or as a computer readable storage medium storing this program. Further, the actions of the system controller 32 may be interpreted as a hot water supply system operating method.

LIST OF REFERENCE SIGNS

1: operation switching manual setting unit, 2: water temperature measurement unit, 3: operation switching unit, 4: compressor frequency setting unit, 5: compressor frequency control unit, 6: operation switching determination value setting unit, 7: water heating completion determination sensor selection unit, 8: control setting value setting unit, 9: circulation pump control unit, 10: three-way valve switching unit, 11: auxiliary heater control unit, 12: high COP operation frequency computation unit, 13: water heating time estimation unit, 20: heat source device, 20-1: housing, 21: water circuit, 22: auxiliary heat source, 23: three-way valve, 24: circulation pump, 25: hot water storage tank, 26: radiator, 27: floor heating appliance, 28: tank unit, 29: second heat exchanger, 30: ambient air temperature sensor, 31: heat source device controller, 32: system controller, 33: heated hot water temperature sensor, 34: return hot water temperature sensor, 35: tank water temperature sensor, 36: room temperature sensor, 37: flow sensor, 201: compressor, 202: water heat exchanger, 203: expander, 204: evaporator, 205: fan, 1000: heat pump hot water supply system

The invention claimed is:

1. A hot water supply system control apparatus for a hot water supply system that includes a heat pump apparatus having a first refrigerant circuit in which a compressor, a first radiator, an expansion mechanism, and an evaporator are sequentially connected by pipes and through which circulates a first refrigerant heated by the compressor; a second refrigerant circuit in which the first radiator is connected with a second radiator that heat-exchanges with hot water storage tank water stored in a hot water storage tank, and in which circulation of a second refrigerant heated by the first refrigerant passing through the first radiator causes the hot water storage tank water to be heated by the second radiator; and a tank water temperature detection sensor that detects a tank water temperature of the hot water storage tank water, the hot water supply system control apparatus comprising:
an operation control unit implemented by circuitry, the operation control unit configured to:
when the tank water temperature of the hot water storage tank water detected by the tank water temperature detection sensor is equal to or lower than a first temperature, operate the hot water supply system with a first operating method until the tank water temperature rises to a second temperature which is higher than the first temperature, the first operating method operating the heat pump apparatus with lower output than a rated operation and with a load rate having a higher coefficient of performance than the rated operation by operating the compressor at a lower frequency than the rated frequency, and
when the tank water temperature exceeds the second temperature, operate the hot water supply system with a second operating method until the tank water temperature rises to a third temperature which is higher than the second temperature, the second operating method operating the heat pump apparatus with a higher heating capacity than the first operating method by operating the compressor at a frequency higher than that for the first operating method,
wherein the hot water supply system further includes
a temperature detection sensor for the second refrigerant that detects a flow-out temperature of the second refrigerant that flows out from the first radiator and a flow-in temperature of the second refrigerant that flows into the first radiator; and
a circulation pump that adjusts a flow of the second refrigerant that flows through the second refrigerant circuit; and
wherein the operation control unit, as the first operating method, operates the hot water supply system including the circulation pump such that the product of a temperature difference multiplied by the flow of the second refrigerant by the circulation pump is constant, the temperature difference being the difference between the flow-out temperature and the flow-in temperature of the second refrigerant detected by the temperature detection sensor for the second refrigerant.

2. The hot water supply system control apparatus of claim 1,
wherein the operation control unit, as the first operating method, operates the compressor at a predetermined operating frequency.

3. The hot water supply system control apparatus of claim 1,
wherein the hot water supply system further includes
a temperature detection sensor for the second refrigerant that detects a flow-out temperature of the second refrigerant that flows out from the first radiator, and
wherein the operation control unit, as the first operating method, operates the hot water supply system such that a constant temperature difference is maintained between the flow-out temperature of the second refrigerant detected by the temperature detection sensor for the second refrigerant and the tank water temperature of the hot water storage tank water detected by the tank water temperature detection sensor.

4. The hot water supply system control apparatus of claim 2,
wherein the hot water supply system further includes
a temperature detection sensor for the second refrigerant that detects a flow-in temperature of the second refrigerant that flows into the first radiator,
the hot water supply system control apparatus further comprising:
a storage unit that stores correspondence relation information indicating a correspondence relation between the flow-in temperature of the second refrigerant that flows into the first radiator and an operating frequency of the compressor, wherein the operation control unit, using as a key the flow-in temperature detected by the temperature detection sensor for the second refrigerant, identifies among the correspondence relation information of the storage unit an operating frequency of the compressor corresponding to the flow-in temperature detected by the temperature detection sensor for the second refrigerant, and operates the compressor at the identified operating frequency.

* * * * *